US009288374B1

(12) United States Patent
Cooper et al.

(10) Patent No.: US 9,288,374 B1
(45) Date of Patent: Mar. 15, 2016

(54) SYSTEMS AND METHODS FOR UPDATING CAMERA CHARACTERISTICS USING A REMOTE COMPUTING DEVICE

(75) Inventors: Ted John Cooper, Sunnyvale, CA (US); Yang Liu, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 440 days.

(21) Appl. No.: 13/608,846

(22) Filed: Sep. 10, 2012

(51) Int. Cl.
*H04N 5/232* (2006.01)
*H04N 9/04* (2006.01)

(52) U.S. Cl.
CPC ............... *H04N 5/232* (2013.01); *H04N 9/045* (2013.01)

(58) Field of Classification Search
CPC ... H04N 2101/00; H04N 9/045; H04N 7/181; H04N 7/188; H05N 5/232; G06Q 30/06
USPC ............. 348/222.1, 231.1, 371, 14.01, 207.1, 348/207.11, 208.99
See application file for complete search history.

(56) References Cited

U.S. PATENT DOCUMENTS

| 5,668,572 A * | 9/1997 | Meyer et al. ................... 345/697 |
| 8,098,894 B2 * | 1/2012 | Soderstrom ................... 382/104 |
| 8,554,010 B2 * | 10/2013 | Hasegawa ..................... 382/274 |
| 2003/0179284 A1 * | 9/2003 | Aoyama ..................... 348/14.01 |
| 2005/0195319 A1 * | 9/2005 | Poplin .......................... 348/371 |
| 2006/0215040 A1 * | 9/2006 | Sugawara ................... 348/220.1 |
| 2007/0140674 A1 * | 6/2007 | Nomura et al. ................. 396/52 |
| 2009/0153689 A1 * | 6/2009 | Shih ......................... 348/222.1 |
| 2009/0315972 A1 * | 12/2009 | Rensin et al. .............. 348/14.02 |
| 2010/0171826 A1 * | 7/2010 | Hamilton et al. ............. 348/135 |
| 2011/0019013 A1 * | 1/2011 | Lin et al. ................... 348/208.4 |
| 2011/0050953 A1 * | 3/2011 | Kim et al. .................. 348/231.1 |
| 2011/0090322 A1 * | 4/2011 | Lawther et al. ................ 348/52 |
| 2011/0128421 A1 * | 6/2011 | Yahata .......................... 348/241 |
| 2012/0135783 A1 * | 5/2012 | Sams ........................ 455/556.1 |
| 2012/0268618 A1 * | 10/2012 | Imai ........................... 348/222.1 |

* cited by examiner

*Primary Examiner* — Amy Hsu
(74) *Attorney, Agent, or Firm* — Sutherland Asbill & Brennan LLP

(57) ABSTRACT

This disclosure relates to systems and methods for adjusting camera device characteristics using a remote imaging server. The camera device may take an initial image before the user takes a picture. The initial image is provided to the imaging server over a network. The imaging server analyzes the initial image and assesses which image parameters may need to be adjusted to capture a higher quality picture. The image parameters may include, but are not limited to, brightness, reflectivity, user vibrations, skin tone, subject movement, light sources, and/or user preferences. The imaging server may provide recommendations or adjustments to the camera device prior to the user taking a picture. The imaging server may also prompt the user to position or orientation of the camera device or a subject prior to taking a picture.

19 Claims, 13 Drawing Sheets

SYSTEMS AND METHODS FOR UPDATING CAMERA CHARACTERISTICS USING A REMOTE COMPUTING DEVICE

BACKGROUND

Photography is creative art form that leverages artistic concepts with the technical capabilities of camera equipment to create electronic or print images. Ambient or environmental conditions may also play a role in creating an image. Photographers may balance these concepts to capture images in unique and interesting ways.

Figure 1:
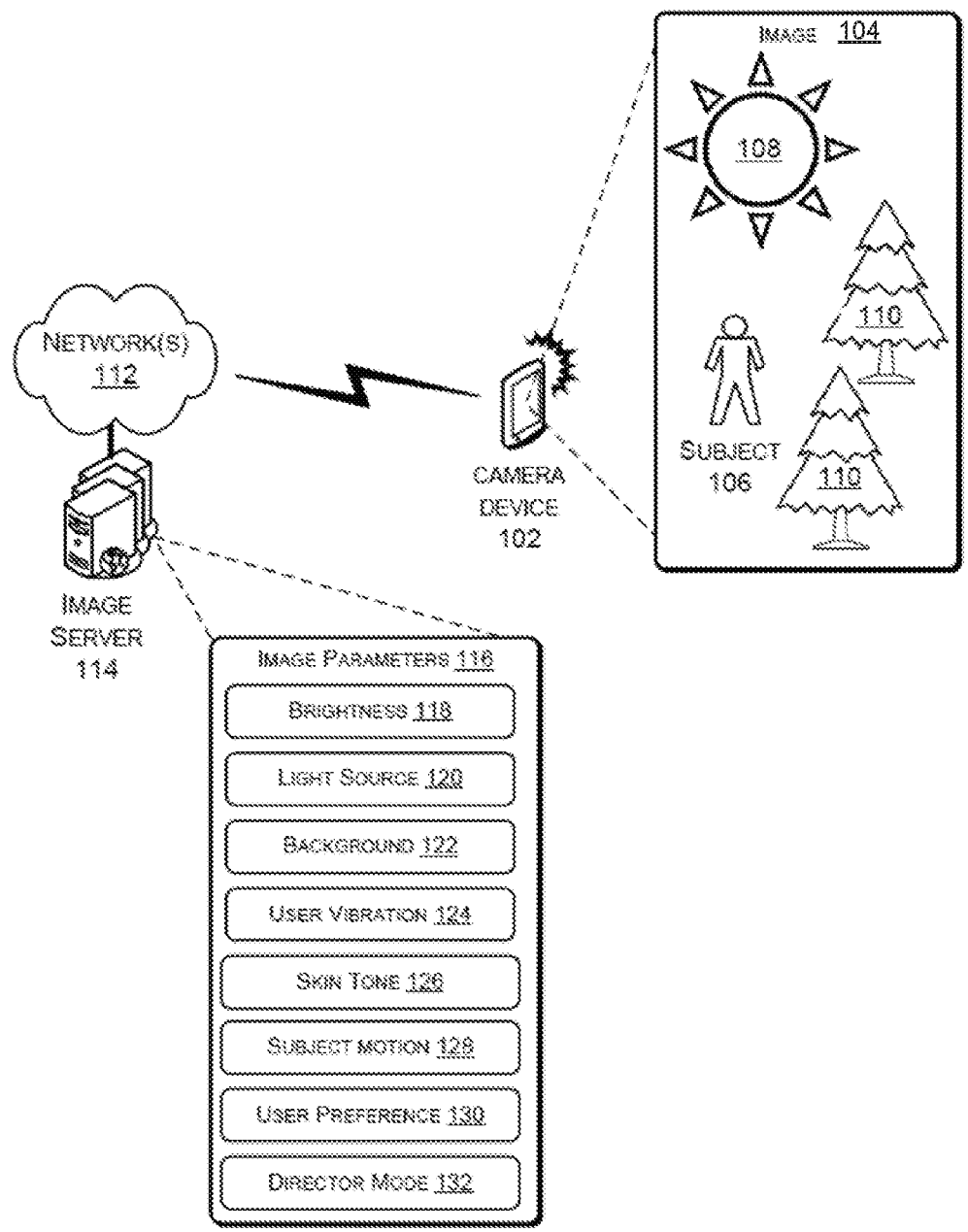
FIG. 1 illustrates a system for determining camera or image characteristics to capture images in a desirable manner in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for determining camera or image characteristics using a remote computing device. The remote computing device may receive a variety of information from a camera related to the environmental conditions associated with a camera's subject and the capabilities of the camera. The remote computing device may analyze the information and determine how to utilize the camera to capture a desirable image or video.

Camera devices are becoming more ubiquitous within society at large due to the increase in camera capable devices. Additionally, camera devices have also increased their amount of processing and memory capability due to the continually decreasing dimensions of their electrical components. Camera devices may also communicate with other devices over a network. Generally, the communication may relate to sharing images with one or more users. However, remote computing devices may also provide information back to the camera to adjust a variety of camera or image characteristics. The information may include camera adjustments based image characteristics, user preferences, or a history of prior images.

In one embodiment, the remote computing device may receive information from the camera device that may be analyzed to determine what types of adjustments may be made to produce a desirable image. For example, the remote computing device may receive an initial image that may be taken by the camera device. The initial image may be taken by the camera device user or the camera may take the initial image when the camera device determines an image is about to be taken. In either instance, the initial image may provide information on the look and feel of the image. The information may include, but is not limited to: brightness, light source type (e.g., flicker frequency), background reflectivity, skin tone reflectivity, and/or subject speed or motion. In certain instances, the information may also include an indication of the location of camera. However, the camera device location may also be determined using positioning or location detection techniques associated with the camera or the network used to exchange the information. The remote computing device may use this information and/or user preference information to adjust how an image may be captured. The adjustments may include, but are not limited to: color adjustments, brightness adjustments, exposure adjustments, focus adjustments, resolution adjustments, and/or zoom adjustments. The adjustments may be based on the information from the initial image, the location of the camera device, and/or user preferences entered by the user or based on image history.

In another embodiment, the remote computing device may provide recommendations or instructions to the camera device. The recommendations and instructions may be derived from general photography principles or they may be based on user preferences. For example, lighting recommendations may be made when the initial image indicates that a subject is obscured by shadows that may not be compensated by brightness adjustments. The recommendation may include adding another light source or moving a light source to a different position. In one particular embodiment, the recommendation may be to move the camera to a different position to leverage the existing light sources. In another specific embodiment, when the primary light source is a natural light source (e.g., the sun), the recommendation may be to wait until a later time in the day to capture the image.

In another embodiment, the remote computing device may receive vibration or motion information associated with stabilizing the camera device before taking a picture. The camera device may include a vibration detection system that may determine how much the camera device is moving prior to image capture. The vibration may be related to hand tremors, user movement (e.g., walking or assuming a positioning stance), or ambient conditions (e.g., wind). The remote computing device may provide vibration adjustments to the camera device. In one specific embodiment, the remote computing device may determine systemic vibration conditions associated with the user based, at least in part, on an image history that may be correlated to consistent hand tremors that may change based on the time of day or over a period of time.

In another embodiment, the remote computing device may highlight image quality issues (e.g., focus, brightness, . . . etc.) to the camera device user and may recommend taking another picture. Images may be ranked on brightness, color, texture, focus and/or any feature that may be used deem a picture desirable. For example, other features may include, but are not limited to: red-eye defects, blue-eye defects, closed eyes, subjects not looking at the camera device, or a lack of smiles on faces.

Illustrative System

FIG. 1 illustrates an embodiment 100 for exchanging information between a camera device 102 that may capture an image 104 that may include a subject 106, a natural light source 108, and background objects 110. While a single camera device 102 and a single image server 114 are shown, it is understood that any number of these devices may be present.

The camera device 102 may exchange information over a network 112 with an image server 114. The information may be analyzed by the image server 114 and may provide adjustments or recommendations to the camera device 102. The adjustments and recommendations may be related to altering or adjusting the image capturing characteristics or parameters of the camera device 102. The image parameters 116 may include, but are not limited to, brightness 118, light source 120, background 122, user vibration 124, skin tone 126, subject motion 128, user preference 130, and/or director mode 132.

The image parameters 116 may be analyzed based on the image 104 that is provided to the image server 114, a location associated with the camera device 102, and/or the user preferences that are stored on the image server 114. In one embodiment, the image 104 may be an initial image that is captured by the camera device 102 prior to the user taking a picture. The initial image may be sent to the image server 114 to determine what adjustments may be made at the camera device 102 prior to the user taking the picture. In one instance, the initial image may be a lower resolution image so that the initial image may be delivered faster than a higher resolution image. The image server 114 may analyze the initial image to determine how to adjust the camera device 102 in view of the image parameters 116. In addition to the initial image, the image server 114 may receive a location associated with the camera device 102. The individual image parameters 116 will be discussed in greater detail below in the description of FIGS. 2-8.

The image server 114 may use the location information to determine the time of day (e.g., lighting conditions), the type of background or setting near the camera device 102, and/or the preferences associated with the location. At a high level, the location information may indicate the camera device 102 is at a particular geographical region (e.g., Asia or Europe), country, state, city, and/or address. The image server 114 may use the geographical region to make adjustments that are determined to be generally more appealing to people of that region, by, for example, using polling data, focus group data, customer survey data, custom, or the like. For example, one group of consumers may prefer a blue-green color adjustment over a red-orange color adjustment preferred by another group of users. The blue-green color adjustment may alter the color or tone of the image to provide slightly stronger blue-green tone than what would be otherwise captured in the image. The red-orange color adjustment would make a similar type of adjustment, except that the image would have a slightly stronger red-orange tone over the natural colors that would ordinarily be captured in the image. This type of preference may extend to any of the other image parameters 116 and may include location specific preferences.

In one embodiment, the specific preferences may relate to being outside or inside any enclosed structure. For example, default image parameters 116 may be established for indoor photography and/or outdoor photography. Default image parameters 116 may also include points of interest (e.g., beaches, mountains) or specific addresses. Another example would be inside a museum near specific artwork or an office within an office building. Based on these specific locations, the image server 114 may be able to determine the lighting or background conditions based on publicly available information or user provided information. For example, the museum location may include wood paneling in the background which may impact image brightness. In another instance, the specific location may include a stadium for sporting events. The image server 114 may change the exposure time or the zoom characteristic of the camera device 102 to account for subject movement during a sporting event.

In certain instances, the image server 114 may also provide feedback on the user initiated images (e.g., not the initial image) to account for any ambient or environmental changes that may have occurred after the initial image analysis. For example, changes in cloud cover may impact the default lighting conditions for outside images. The image server 114 may prompt the user to take another picture using a new brightness adjustment. In another instance, the subject may move or move at a faster rate. The image server 114 may prompt the user to take another picture using a different exposure time to account for the change in the subject's motion 128.

The information exchange between the camera device 102 and the image server 114 may enable a user to account for variables related to taking pictures. The imaging server 114 may manage the camera device 102 in a way that is seamless and unobtrusive. For instance, the user may elect for the image server 114 to alter the images without prior approval. The image server 114 may make changes to the camera device's characteristics (e.g., color, exposure, . . . etc.) to account for information derived from the initial image or the location of the camera device 102. In another instance, the user may elect to be prompted before any changes are made by the image server 114. The changes being made may be based, at least in part, on the image parameters 116 which will be described in greater detail in the description of FIGS. 2-8.

Figure 2:
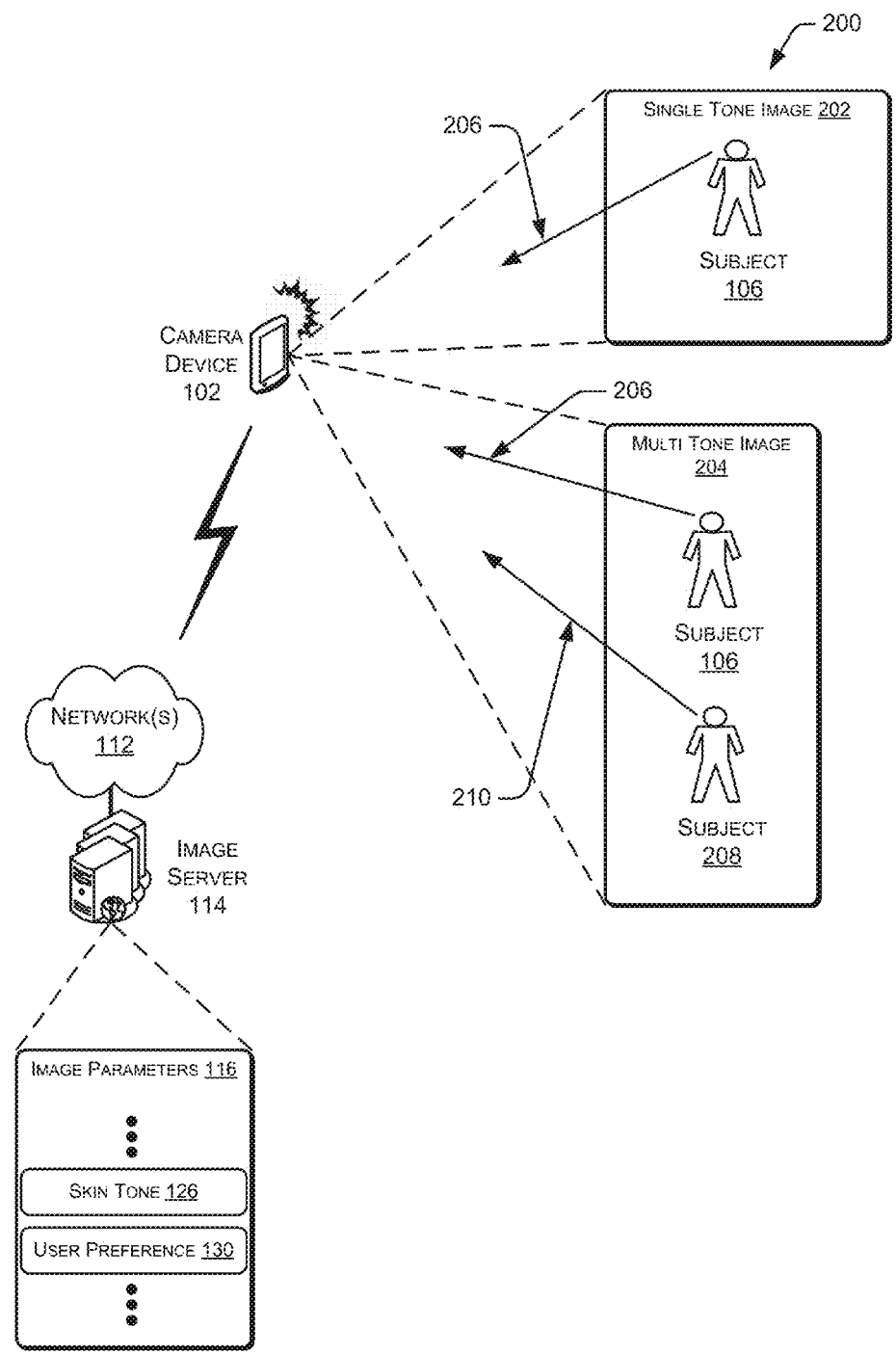
FIG. 2 illustrates an embodiment for determining camera or image characteristics based, at least in part, on skin tone of subjects in an image in accordance with one or more embodiments of the disclosure.

FIG. 2 illustrates an embodiment 200 for determining camera or image characteristics based, at least in part, on the skin tone 126 of subjects in a single tone image 202 embodiment and a multi-tone image 204 embodiment. Different skin tones may impact the color and brightness of features of an image in different ways. Light will reflect differently off of different colored skin, whether based on ethnicity, environmental conditions (e.g., sun exposure), genetic conditions, medical conditions, etc. and may result in different hues or colors that may not be captured properly. For instance, artificial light may cause the skin color, hue, or tone to take on a tone that is too red, blue, or green based on the light reflectivity differences between different skin tones. The visible light spectrum may include the 380 nm-750 nm range of the electromagnetic spectrum. The visible light colors may include red, orange, yellow, green, blue, indigo, and violet.

In the single tone image 202 embodiment, the light 206 may reflect off of the face of the subject 106 and may be captured by the camera device 102 in the initial image. The initial image may be sent to the image server 114 and may undergo a facial recognition procedure that detects the face and determines the skin tone, hue, or color associated with the face. The image server 114 may determine a brightness adjustment or a color enhancement based on the skin tone. This may be done in conjunction with other lighting or brightness considerations that will be discussed in greater detail in FIGS. 3-8. In one instance, the user preferences 130 may dictate certain color enhancements based on the whether the skin tone is representative of a subject having a particular ethnicity or geographic location. For example, when the skin tone characteristics of one group are detected, the image server 114 may recommend using a blue-green enhancement to the camera device 102 or may make the adjustment after the picture is received from the camera device 102. When the skin tone characteristics of another group are detected, the image server 114 may recommend a red-orange enhancement.

In another embodiment, the camera device 102 may conduct the facial recognition procedure and may send that information to the image server 114 to conduct the skin tone 126 analysis. Alternatively, the camera device 102 may also conduct the skin tone 126 analysis and may also provide that information to the image server 114. Accordingly, the image server 114 may use the information to adjust the camera device 102 characteristics as noted above in the previous embodiment.

The multi-tone image 204 may include more than one subject (e.g., subject 206, subject 208) with, for example, at least two of the subjects having significantly different skin tones. In this embodiment, the first subject 106 may be of a first group and the second subject 208 may be of a second group. The camera device 102 will capture the light 206 reflecting off the skin of the first subject 106 and the light 210 reflecting off of the second subject 208. The imaging server 114 may determine that the first subject 106 has a first skin tone and the second subject has a second skin tone. In one embodiment, the imaging server 114 may average the color enhancement of all the subjects and make color enhancement recommendations accordingly. In another embodiment, the imaging server 114 may determine a national origin is a majority of the subjects in the image and make the color enhancement associated with the majority. In another embodiment, the imaging server 114 may also incorporate location information or user national origin to determine a color enhancement recommendation. For example, the location of the camera device 102 may be used to override the color enhancement feature. In that instance, if a user of a first group is taking pictures of subjects from a second group in a geographic location of the first group, the preferred color enhancement may still be the first group color enhancement regardless of the skin tone determination. In certain instances, the user may be prompted to select a color enhancement when there is a decision to be made between a location based preference and an image based preference (e.g., skin tone). Alternatively, the user may elect a default rule to use a location based preference over an image based preference or an image based preference over a location based preference.

Figure 3:
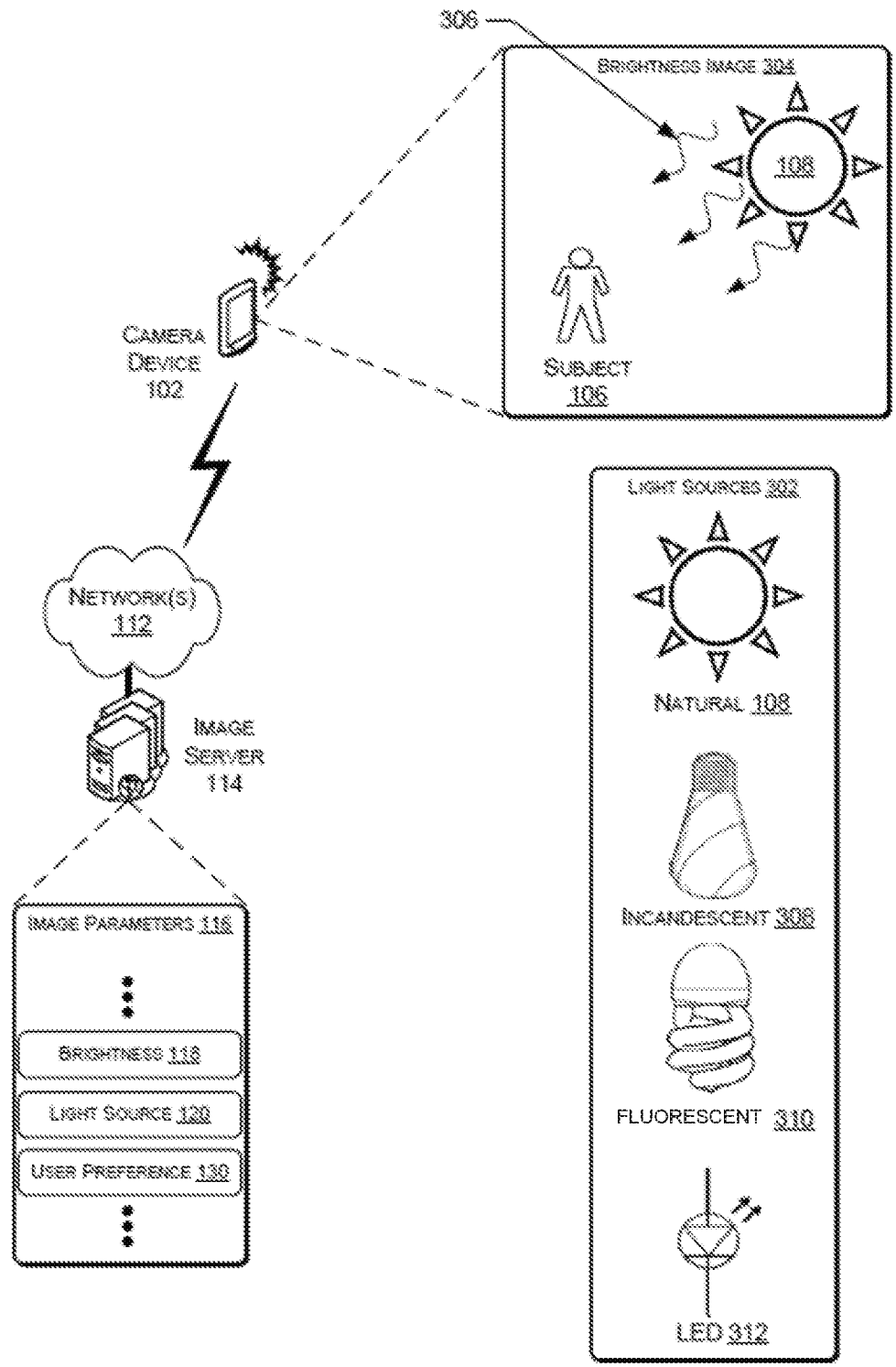
FIG. 3 illustrates an embodiment for determining camera or image characteristics based, at least in part, on brightness and light sources associated with an image in accordance with one or more embodiments of the disclosure.

FIG. 3 illustrates an embodiment 300 for determining camera or image characteristics based, at least in part, on brightness 118 and light sources 302 associated with brightness image 304. Brightness may be based on the perception of light by an observer. In one instance, brightness may be an effect or sensation in which an observer is able to distinguish differences in luminance. Luminance may be measured in units of candela per square meter. When the brightness is too high, the brightness image 304 may be washed out by the higher amount of light so that local image details may not be easily discernible. When the brightness is too low, the brightness image 304 may be dark enough to obscure objects or diminish the color of the objects.

The camera device 102 may capture the intensity or luminance of an image based on the amount of light 306 that is directed to camera device 102 by a light source (e.g., natural light 108) or reflected off of objects (e.g., subject 106) within the brightness image 304 or the initial image. In one embodiment, the image server 114 may adjust the exposure value or the shutter speed to account for brightness (or the lack thereof). An exposure value of zero may correspond to an exposure time of one second and a relative aperture of f1. An increment of one in exposure value may correspond to a change in half as much exposure by either halving the exposure time or the aperture area or a combination thereof. The exposure value may need to be increased for brightly lit images and decreased for dimly lit images. In one embodiment, the image server 114 may direct the camera device 102 to take multiple pictures of the same scene using a different exposure value for each picture. For example, a first picture may have an exposure value of one, a second picture may have an exposure value of two, and a third picture may have an exposure value of zero.

In addition to brightness, the light sources 302 that may be incorporated into the brightness image 304 may impact image quality based on the operating frequency associated with each light source 302. The operating frequency may be related to the line frequency of electricity delivery networks. Light sources may flicker at the line frequency which may be captured by the brightness image 304. Black bands may be shown in the image as a result of the flicker problem. The camera device 102 or the image server 114 may adjust the exposure to account for this problem when it is detected. The line frequency may also be country or region specific and maybe 50 Hz or 60 Hz. The image server 114 may account for flicker issues based on the location of the camera device 102. This technique may be used in addition to or in lieu of the flicker detection by the camera device 102 or the image server 114. The natural light source 108 may not be associated with this problem since its luminance is not dependent on the electricity delivery networks. In one embodiment, the flicker issue may be resolved by adjusting the exposure level or timing. For example, if the exposure level is set for a quarter of a second then the flicker issue may be resolved. In another embodiment, the image server 114 may also adjust the exposure timing to account for the light sources 302 turning on and off at 50 Hz or 60 Hz.

The type of light sources may include, but are not limited to: natural light 108, incandescent light 308, fluorescent light 310, and light emitting diodes (LED) 312. Natural light 108 may include, but is not limited to: sun light, candle light, firelight, or any other light emitting process that may not include the electricity delivery network. Incandescent light 308 is an electric light that may receive power from the electricity delivery network. The incandescent light 308 may include a filament wire that emits light when an electrical current flows through the filament. Fluorescent light 310 is an electric light that uses electricity to excite mercury vapor to emit short wave ultraviolet light that causes a phosphor to produce visible light. LEDs 312 are electric lights that produce visible light by passing electricity through a light emitting diode. In one specific embodiment, the LED light may have a frequency of 200 Hz.

Figure 4:
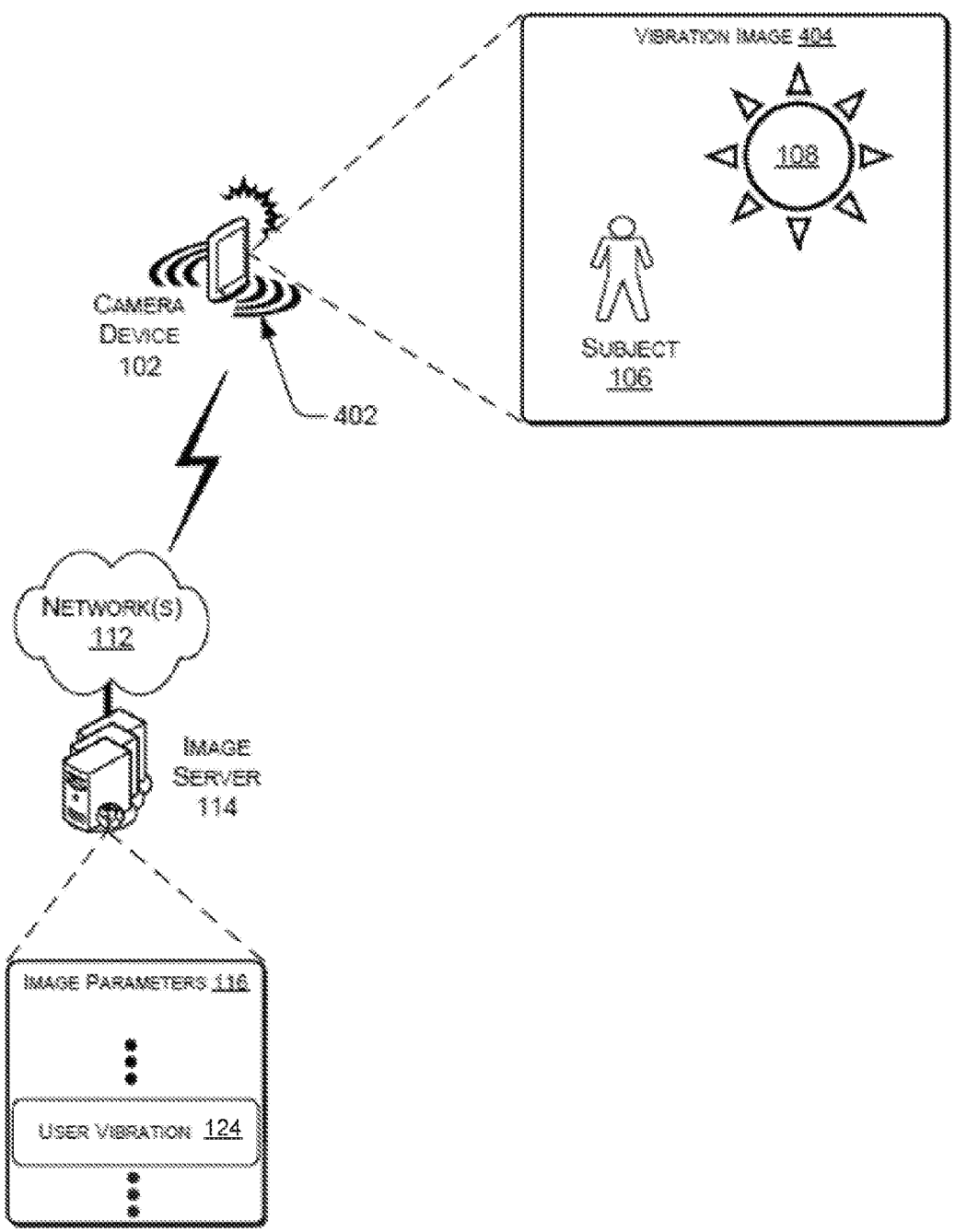
FIG. 4 illustrates an embodiment for determining camera or image characteristics based, at least in part, on motion associated with a camera in accordance with one or more embodiments of the disclosure.

FIG. 4 illustrates an embodiment 400 for determining camera or image characteristics based, at least in part, on operator vibration 402 associated with a camera user stabilizing the camera device 102 in preparation to take a picture (e.g., vibration image 404). Operator vibration 402 may occur as a result of slight hand tremors that may vary based on age, time of day, or month-to-month. For example, older users may experience more hand vibration than younger users. Hand vibrations may peak during the morning hours and decline through midday. In some instances, hand vibrations may increase at night. The amplitude and the frequency of the vibrations may change throughout the day. In some cases, hand vibrations may be periodic over longer time intervals. For example, month-to-month trends may show a pattern of hand vibrations that are predictable.

In this embodiment 400, the camera operator (not shown) may stabilize the camera device 102 to take a picture. An accelerometer (not shown), may record the amount of motion or operator vibration 402 of the camera device 102. The image server 114 may record the operator vibration 402 information along with the time of day and date to build a vibration database (not shown) associated with the camera operator. The vibration database may include hand vibration compensation factors. The image server 114 may provide hand vibration compensation factors to the camera device 102 to counter on-going operator vibration 402 detected by the accelerometer or predicted hand vibration determined using the vibration database. The impact of operator vibration 402 is reduced by lowering exposure time or by using digital stabilization techniques at the image server 114 or at the camera device 102.

Figure 5:
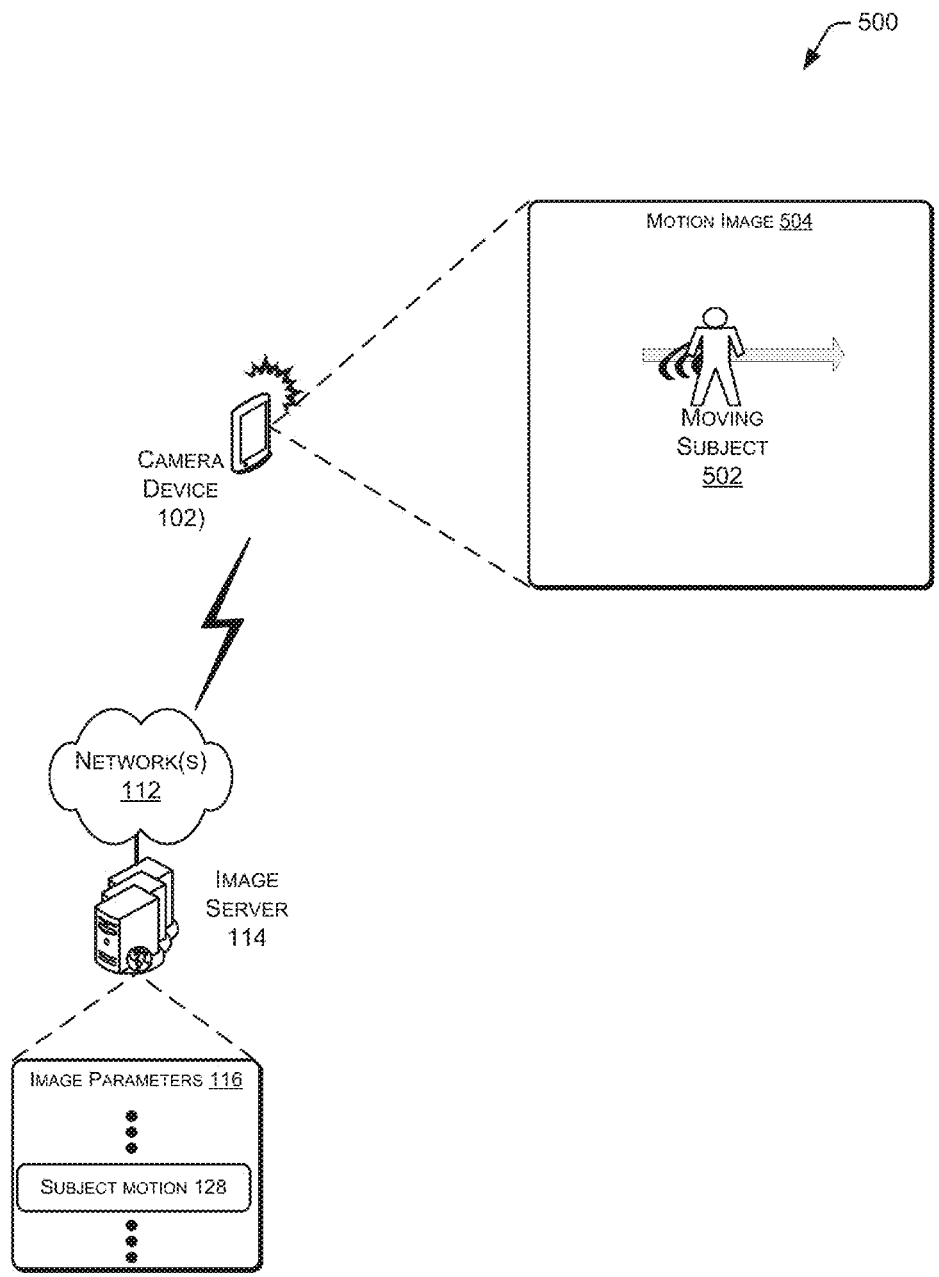
FIG. 5 illustrates an embodiment for determining camera or image characteristics based, at least in part, on motion associated with a subject in accordance with one or more embodiments of the disclosure.

FIG. 5 illustrates an embodiment 500 for determining camera or image characteristics based, at least in part, on subject motion 128 associated with a moving subject 502 in a motion image 504. The camera device 102 may capture a moving subject 502 in the initial image that is provided to the image server 114. The initial image may show a blurred moving subject 502 moving in a certain direction. The speed and direction of the moving subject 502 may be determined by the image server 114. Accordingly, the image server 114 may determine an exposure time or shutter speed that may reduce the blurriness associated with the moving subject 502. Alternatively, the image server 114 may recommend zooming out from the moving subject 502 to reduce blurriness. The recommendation may also include adjusting exposure time in conjunction with zooming out. In either instance, the image server 114 provides the motion adjustments to the camera device 102 over the network 112.

Figure 6:
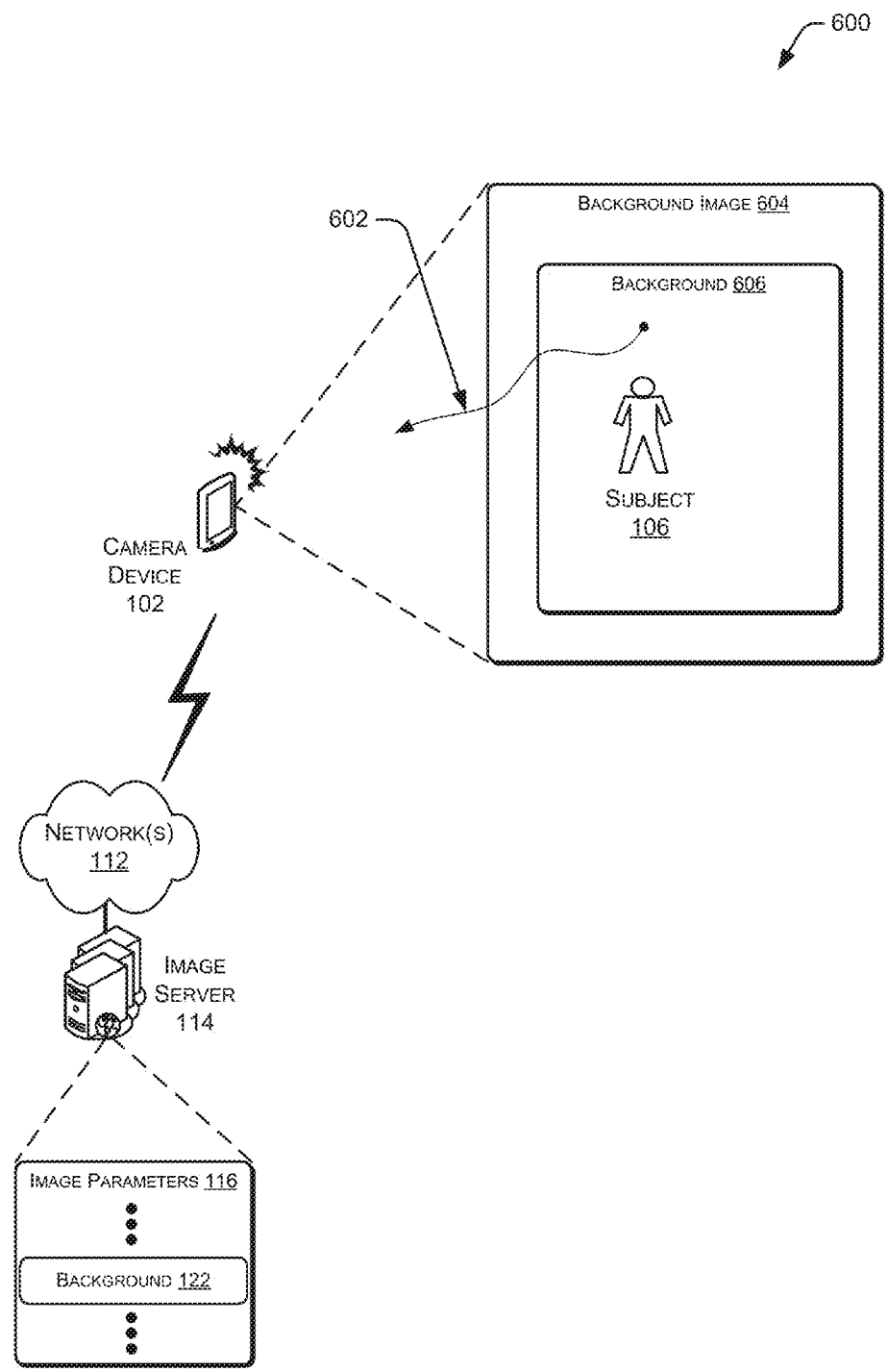
FIG. 6 illustrates an embodiment for determining camera or image characteristics based, at least in part, on background reflectivity associated with an image in accordance with one or more embodiments of the disclosure.

FIG. 6 illustrates an embodiment 600 for determining camera or image characteristics based, at least in part, on a background object 602 reflectivity associated with a background image 604 behind a subject 106. An image background 606 can have a strong impact on the brightness and overall image quality. Light may be reflected or absorbed by a background object 602. Highly reflective background objects 602 may direct a larger amount of light to the camera device 102 than lower reflective backgrounds. For example, snow has a higher reflectivity than a forest of trees. Hence, snow will reflect a larger amount of light from the sun and increase the amount of brightness in the image.

In this embodiment 600, the image server 114 determines background reflectivity in at least two ways. The initial image provided by the camera device 102 may provide empirical information related to the background object 602 reflectivity. The image server 114 may also determine background reflectivity based, at least in part, on the location of the camera device 102. The location may be in the mountains and the image server 114 may determine that there is snow on the ground based on weather reports. The location may be inside a building and the image server may be able to determine the type of background objects that may be present. For example, a room in a museum may be known to have wood paneling around certain exhibits. The image server 114 may be able to determine or predict the amount of reflectivity from the wood paneling without having to receive the initial image. In another instance, another room in the museum may have marble walls. The image server 114 may determine or predict the amount of reflectivity from the marble walls without receiving the initial image. Based on the higher reflectivity, the image server 114 may recommend a higher exposure setting to minimize the impact of the background object 602. In a low reflectivity situation, the image server may recommend a lower exposure setting.

In another embodiment, the image server 114 may determine the reflectivity or brightness levels based on the camera device 102 location based on other images taken at the location by the current user or from other users. For example, the image server 114 may search for other pictures that may have been taken at the same location to determine the possible lighting, brightness, or reflectivity conditions associated with the location. This analysis may also include the time of day, time of year, or a season associated with the images. Additionally, the image server 114 may also use any metadata associated with the pictures to determine the type of camera device that may have been used to take the picture. The metadata may also include any camera settings or configurations that the camera used to take the picture.

Figure 7:
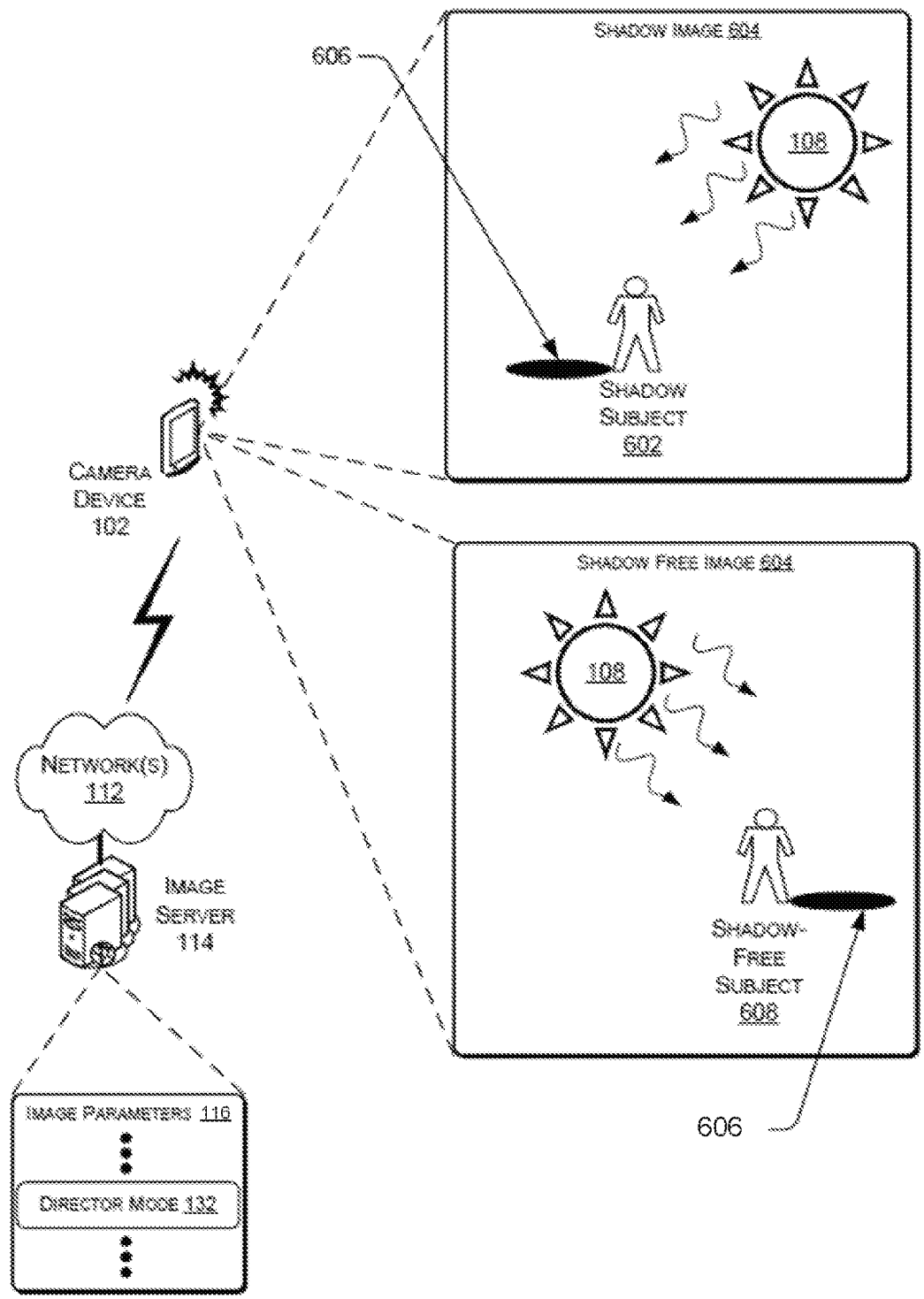
FIG. 7 illustrates an embodiment for determining camera or image characteristics based, at least in part, on ambient or environmental conditions associated with an image in accordance with one or more embodiments of the disclosure.

FIG. 7 illustrates an embodiment 700 for determining camera or image characteristics based, at least in part, on ambient or environmental conditions associated with an image. Broadly, the director mode 132 of the image server 114 may provide recommendations on how to position a camera device 102, a subject 106, or suggest a time when a picture should be taken. One embodiment 700 may pertain to adjusting a camera position or a subject position due to shadow effects caused by the position of a light source 108, the camera device 102, and a shadow subject 602. The shadow image 604 illustrates how the position of each of the aforementioned components may create a shadow 606 that may obscure the details of the shadow subject 602 from the camera device 102. The light source 108 is behind the shadow subject 602, and the camera device 102 is in front of the shadow subject 602. When the primary light source 108 is behind the shadow subject 602, the features of the shadow subject 602 may be obscured because the camera device 102 may receive less light from the shadow subject 602 than from the background objects. This effect is illustrated by the shadow 606 in the shadow image 604. In this instance, the image server 114 may recommend that the camera device 102 be placed between the light source 108 and the shadow free-subject 608. Alternatively, the recommendation may instruct the user to move the shadow-free subject 608 to behind the light source 108. In this way, the shadow 606 will be cast behind the shadow-free subject 608 and will enable more light to reflect off of the front side of the shadow-free subject 608 and be captured by the camera device 102.

In another embodiment, the imaging server 114 may recommend adding an additional light source to enable more light to reflect off the front side of the shadow subject 602. The recommendation may include using electrical lights or using reflective surfaces that may redirect light from the light source 108 to the front side of the shadow subject 602.

In another embodiment, the shadow subject 602 may be an unmovable object (e.g., statue). In this instance, the imaging server 114 may recommend moving the location of the camera device 102 or waiting until a time of day in which the light source 108 (e.g., the sun) may have shifted so that the shadow subject 602 may become the shadow free subject 608.

In another embodiment, the imaging server 114 may recommend positioning the camera device in a portrait or landscape position to capture certain types of images. This may also include recommending certain types of zoom picture opportunities. The imaging server 114 may also recommend adding or reconfiguring the camera device 102 with different lenses, filters, and/or software updates or add-ons.

In another embodiment, the director mode 132 may also review the images to select which images are more likely to be preferred over other images. The imaging server 114 may consider, but is not limited to, image clarity, lighting, and/or color. In addition to the image parameters 116, the director mode 132 may also determine preferred images based, at least in part, on whether people are looking and/or smiling at the camera. This may also include determining if people are obscured by other people in the picture. The imaging server 114 may also compare similar images to determine which items would be preferred.

The director mode 132 may also detect and correct for red-eye and blue-eye defects. Red-eye defects are the result light reflecting off the retina in a subject's eye. The director mode 132 may notify the user of the defect and recommend a different lighting arrangement to mitigate the amount of light reflecting off of the retina. For example, the user can disable the flash bulb on the camera device 102 or direct the flash away from the subjects eyes (e.g., at the wall or ceiling). Under certain circumstances, the director mode 132 may recommend not using the flash bulb, lighting conditions permitting. Blue-eye defects are similar to red-eye defects, except that the defect occurs in animals. The blue-eye defect may be remedied in a similar manner as the red-eye defect.

The director mode 132 may also detect eye movement or position when the user looks sites or aligns the user device 102 by placing their eye in proximity to the user device 102. The imaging server 114 may determine the primary subject or object for the image capture. For example, the eye movement may indicate that the user is interested in a moving object in the initial image. The director mode 132 may indicate that the image recommendations are driven by the moving object. This may include adjusting brightness, exposure values, focus, or any other parameters based, at least in part, on the moving object instead of stationary objects or the background. Eye movement or position may also be used to determine the primary subject of the initial image. An image may include several subjects (e.g., person or background) in the foreground and background. The position of the eye may indicate which of the subjects is of primary interest to the user. For example, several people may be included in an image, but the user's eye may be directed to the background (e.g., statue, sunset scene). The director mode 132 may use that eye position information to make adjustments or recommendations that favor the image quality of the background over the image quality of the people. However, when the director mode 132 determines that the user's eye is targeting the people in the image, the user device 102 adjustments or recommendations are based, at least in part, on the image quality associated with the people rather than other objects in the image.

In another embodiment, the imaging server 114 may also receive camera device 102 resource information (e.g., remaining power, remaining memory). The imaging server 114 may recommend using lower resolution images to conserve power or memory when the power and memory on the camera device 102 is limited. In another instance, the recommendation may include taking still images instead of video images in order to conserve power and/or memory.

Figure 8:
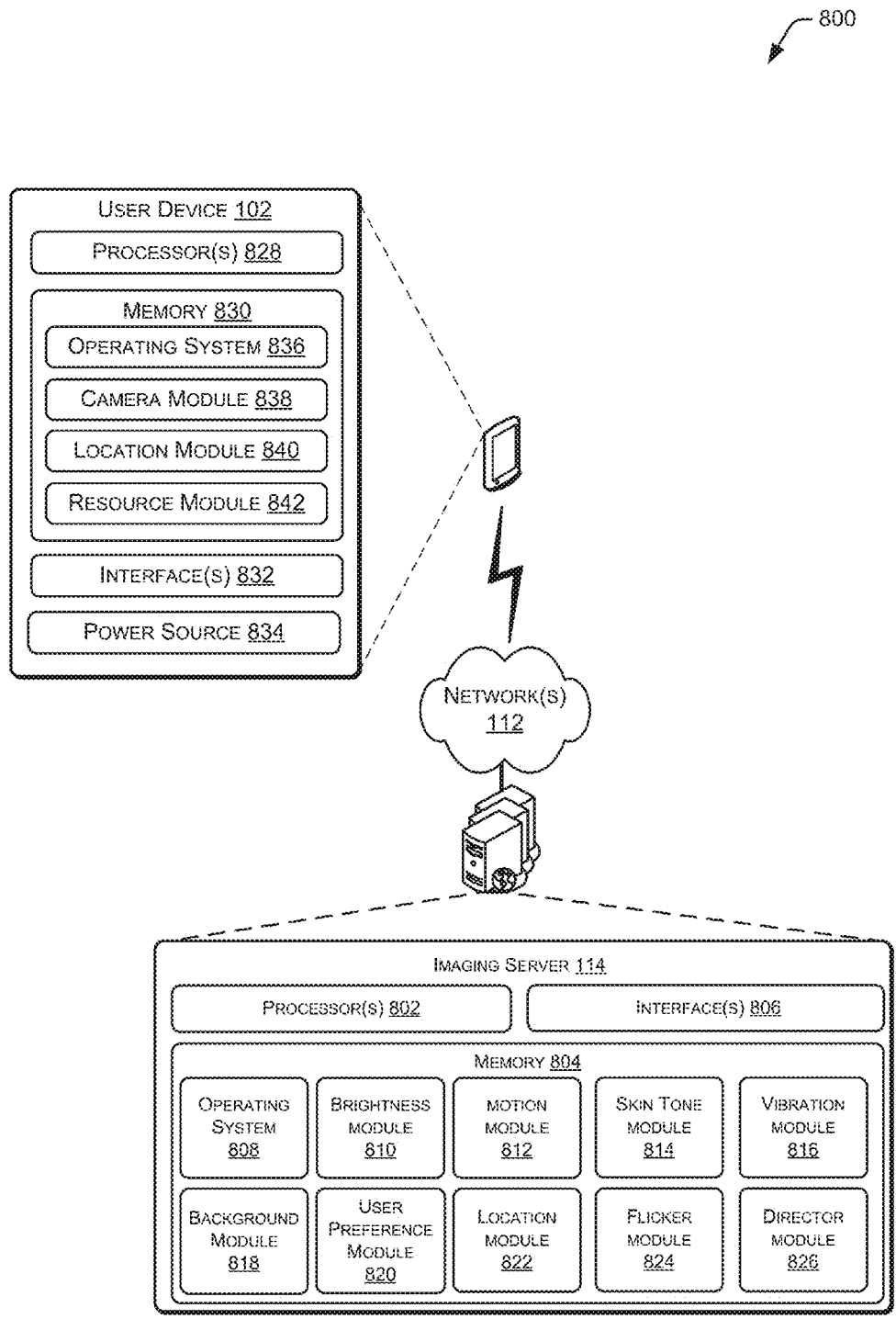
FIG. 8 illustrates a system for determining camera or image characteristics in accordance with one or more embodiments of the disclosure.

FIG. 8 illustrates a system 800 for determining adjustments to camera or image characteristics for a camera device 102 using an imaging server 114 that is electrically coupled to the camera device 102 by a network 112. At noted above, the camera device 102 may take or capture any still or moving images that may be electronically sent to the imaging server 114 for analysis. The imaging sever 114 may provide adjustments to the camera device 102 that may improve the look and feel of the images being taken by the camera device 102. While a single camera device 102 and a single imaging server 114 are shown, it is understood that any number of these devices may be present in the system 800.

The image server 114, which may include one or more processors 802, a memory 804, and one or more interfaces 806 to communicate with the camera device 102.

The computer processors 802 may comprise one or more cores and are configured to access and execute (at least in part) computer-readable instructions stored in the one or more memories 804. The one or more computer processors 802 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The image server 114 may also include a chipset (not shown) for controlling communications between the one or more processors 802 and one or more of the other components of the image server 114. In certain embodiments, the image server 114 may be based on an Intel® architecture or an ARM® architecture, and the processor(s) 802 and chipset may be from a family of Intel® processors and chipsets. The one or more processors 802 may also include one or more application-specific integrated circuits (ASICs) or application-specific standard products (ASSPs) for handling specific data processing functions or tasks.

The interfaces 806 may also comprise one or more communication interfaces or network interface devices to provide for the transfer of data between the imaging server 114 and another device directly such as in a peer-to-peer fashion, via a network 112, or both. The communication interfaces may include, but are not limited to: personal area networks ("PANs"), wired local area networks ("LANs"), wireless local area networks ("WLANs"), wireless wide area networks ("WWANs"), and so forth. In FIG. 8, the imaging server 114 is coupled to the network 112 via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the imaging server 114 and another device such as an access point, a host computer, a server, a router, a reader device, another imaging server 114, and the like. The network 112 may include, but is not limited to: the Internet, a private network, a virtual private network, a wireless wide area network, a local area network, a metropolitan area network, a telephone network, and so forth.

The one or more memories 804 comprise one or more computer-readable storage media ("CRSM"). In some embodiments, the one or more memories 804 may include non-transitory media such as random access memory ("RAM"), flash RAM, magnetic media, optical media, solid state media, and so forth. The one or more memories 804 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 804 may store an operating system 808 that includes a plurality of computer-executable instructions that may be implemented by the processor 802 to perform a variety of tasks to operate the interface(s) 806 and any other hardware installed on the imaging server 114. The memory 804 may also include: a brightness module 810, a motion module 812, a skin tone module 814, a vibration module 816, a background module 818, a user preference module 820, a location module 822, a flicker module 824, and a director module 826.

A brightness module 810 may analyze the initial image from the camera device to determine the level of brightness within the image and the types and locations of light sources. The brightness module 810 may determine what adjustments may be made to the camera device 102 to increase or decrease the level of brightness. Additionally, the brightness module 810 may also determine post-picture capture adjustments that may be made to adjust image brightness.

The brightness module 810 may determine the level of brightness based, at least in part, on the level of clarity or detail within an image 104. For example, a determination may be made on whether faces are easily recognizable or are covered in a shadow. This clarity determination may also apply to other objects within the image 104. The brightness module 810 may also determine the location of light sources based, at least in part, on the shadows associated with objects in the image. For example, the shadows may indicate the light source is overhead, behind, to the left or right, or in front of the objects in the image. Additionally, the brightness module 810 may also determine when multiple light sources are being used and may determine their relative position from each other.

The brightness module 810 may also determine whether the light sources are interior or exterior lighting based, at least in part, on the time and/or location of the camera device 102. For example, the location may be outside, and the brightness module 810 may reference time and weather information to determine the image brightness. For example, the brightness module 810 knows the camera device 102 is outside at 2 pm on a cloudy day. Therefore, the brightness module 810 may skew the exposure adjustment to account for the estimated location of the sun and the surrounding clouds.

The brightness module 810 may also receive an indication of interior lighting from the flicker module 824 that may detect the flicker frequency associated with electrical lighting. The flicker module will be discussed in greater detail below in the description of FIG. 8. The flicker module 824 may determine the on/off frequency of electrical lights that receive power from electricity delivery network. The line frequency for the network may be at 50 Hz or 60 Hz which induces a flicker at that frequency that may impact image quality. Black bands across the picture may be visual representation of the flicker frequency.

In another instance, the brightness module 810 may also determine an image is an exterior or interior image based, at least in part, on the amplitude of light determined from analyzing the initial image or by determining the color temperature associated with the initial image. Color temperature may be associated with the warmth or coolness of a light source. When an object is heated, the color of light that it emits or reflects will change. Color temperatures over 5000 Kelvin may be referred to as cool colors (e.g., bluish white), while lower color temperatures (e.g., 3000 kelvin) may be referred to as warm colors (e.g., yellow through red). Color temperatures of light may not be the actual thermal temperature of an object. The color temperature may also be correlated with a wave length of light or types of light sources. For example, a 60 W incandescent light may have a color temperature of 2700 Kelvin, a 13 W Fluorescent light may be 3500 Kelvin, a 13 W Fluorescent light may be 5500 Kelvin.

Based on the brightness determinations, the brightness module 810 may recommend the camera device 102 implement exposure value changes to increase or decrease brightness. The brightness module 810 may generate a histogram of brightness for the image to determine an exposure value. For instance, if the histogram may indicate the relative brightness of certain objects within an image may be washed out when attempting to increase the brightness for other objects that may be too dark. For example, a portion of the image may not be properly lit, while another portion of the image has sufficient lighting. Increasing the brightness based on the dimly lit portion may wash out (e.g., turn white) the properly lit portion of the image. The brightness module 810 may also warn a user when the light level is too low to capture higher resolution images and that lower quality pictures may captured instead.

A motion module 812 may determine the motion of a moving subject 502 within an image 504. The motion module 812 may detect the movement based on the clarity of an image relative to the clarity of surrounding images. For example, a moving object (e.g., a runner) may be compared to non-moving objects (e.g., trees in the background) to determine which objects are moving and that the motion may not be a result of camera device 102 movement. For instance, if all the objects lack clarity, the motion module 812 may determine the camera device 102 is moving and may attempt to address camera movement adjustments using image stabilization procedure. When the motion module 812 determines an image object is moving, the camera device's 102 exposure or shutter speed may be adjusted. For example, the shutter speed may be increased to clearly capture moving objects. In some instances, the amount of zoom may also be adjusted to account for moving objects within an image. For example, the camera device 102 may be instructed to zoom out to improve the clarity of the moving object.

The motion module 812 may also determine focus adjustments based on the movement of the subject. For example, the motion module 812 may determine that the subject is moving towards or away from the camera device 102. The focus adjustment may be based, at least in part, on the predicted or estimated location of the moving subject 502. The prediction may be based, at least in part, on the movement of the moving subject 502 and/or the movement of the camera device 102. The motion module 812 may recommend adjusting the shutter speed, aperture adjustments, and/or exposure adjustments. The exposure adjustments may be based, at least in part, on brightness changes caused by the movement of the moving subject 502 and the change in the location of the light source relative to the moving subject 502.

A skin tone module 814 may determine the skin tone of one or more subjects (e.g., subject 106 and subject 208) to determine tone adjustments based, at least in part, on nationalistic or geographic preferences. Different skin tones may reflect light in different ways that may impact the aesthetic quality (e.g., brightness or clarity) of the picture. Accordingly, the skin tone module 814 may optimize the image settings to capture a quality image regardless of the image subject's skin tone. The nationalistic or geographic preferences may also augment the atheistic quality by enabling nationalistic or geographic preferences for users that are from or that are in a certain geographic region.

The skin tone module 814 may determine the geographic preferences in at least two ways. In one embodiment, the geographic preferences may be based on the location of the camera device 102. For example, when the camera device 102 may be located in country or region, the skin tone module 814 may implement preferences characteristic of people from that area. The preferences may also be related to specific countries or regions of countries and may not be limited to broad geographic origins that may include several countries. These preferences may be incorporated by the skin tone module 814 or the user preference module 820.

In another embodiment, the skin tone module 814 may determine image parameters based, at least in part, on the skin tone of one or more subjects within an image 202. Skin tone may be determined based on the color of facial skin color. In one instance, the skin tone module 814 may implement a facial recognition procedure to locate one or more faces within an image 202. Based on the type of light reflected from the skin, the skin tone module 814 may implement image adjustments based on preferences associated with the respective nationalities. For example, a blue-green color enhancement may be preferred by first group of users. While, a red-orange enhancement may be preferred by a second group of users. In another embodiment (e.g., multi tone image 204), an image may have more than one face and they are associated with people from the first and second groups of users. The skin tone module 814 may average the adjustments together to generate a new color adjustment that attempts to accommodate both groups of users. In another instance, the skin tone module 814 may determine which user group predominates within the image. For example, five first group users and two second group users are in the image. In this instance, the skin tone module 814 may elect to use the first user group preference adjustments over the second users group preference adjustments.

The skin tone module 814 may also use the location of the camera device 102 to determine national preference adjustments when multiple nationalities are present. For example, when the camera device 102 is located in first group geographic region, the skin tone module 814 may use the first group preferences over the second group preferences. Accordingly, when the camera device 102 is located in a second group region, the skin tone module 814 may implement the second group preferences even when the first group users are detected in the image. Of course, a user may elect to override the above preferences and implement their own personal preferences regardless of the camera device location 102.

A vibration module 816 may analyze images or accelerometer data from the camera device to determine the amount of vibration caused by the user when they are taking pictures. As noted above in description of FIG. 4, user vibration may be a systematic characteristic when a user attempts to stabilize the camera device 102 during picture taking User vibration may be based, at least in part, on the time of day and the age of the user. User vibrations have been shown to be greater in the morning time and decrease into the afternoon. However, the vibrations may increase into the evening hours. Vibrations for older user may have higher amplitudes and frequencies when compared to younger users. The vibration module 816 may record the vibration history associated with a user to create a vibration history. For example, the vibration history may be used to generate an intra-day vibration model, a month-to-month vibration model, or a seasonal vibrational model. The vibration module 816 may use the model to implement a stabilization procedure for the camera device 102 that may minimize the impact of the user vibrations on the images being taken. For instance, the vibration module 814 may reference the time of day or month and proactively implement the stabilization procedure using the model data when the user attempts to stabilize the camera device 102 to take a picture.

The vibration module 816 may also make recommendations positioning the user device 102 to take portrait or landscape pictures based on the amount of vibration related to holding the user device 102 in either position. For example, when the user is holding the user device 102 in a landscape position, the amount of vibration may be greater than holding the user device 102 in a portrait position. Accordingly, the vibration module 816 may recommend using landscape or portrait positioning to minimize user induced vibration.

A background module 818 may determine the impact of a background 606 on an image 604 and to use the background information to make camera device 102 adjustments during picture taking. The background module 818 may determine the impact of the background based, at least in part, on the initial image from the camera device 102 and/or the location of the camera device 102. Broadly, the background module 818 may determine the type of materials or objects that compose the background 606 associated with a subject 106. Based on this determination, the background module 818 may provide adjustments to the camera device 102 to account for any impact on the image parameters 116 (e.g., brightness).

In one embodiment, the background module 818 may determine the background 606 may include a highly reflective surface that may wash out the brightness of the image 604. For example, the background 606 may be a snow covered hill behind the subject 106. In this case, the background module 818 may recommend adjusting the exposure value to limit the brightness impact of the snow. The background module 818 may also distinguish between a various aspects of the background 606 and determine the likelihood that the various aspects of the background 606 may cause an overall image brightness issues or a localized brightness issue. For example, the snow covered hill dominates the background 606 and may be more likely to cause a washout effect than small reflective surface that is adjacent to or behind the subject 106. Accordingly, the background module 818 may provide an exposure adjustment for the snow hill picture and not make an exposure adjustment for the small reflective surface in the background 606. However, the background module 818 may conduct a post-picture analysis to determine which background features may have impacted the image parameters 116 and may recommend taking another picture that includes an exposure value adjustment.

In another embodiment, the background module 818 may prompt the user to determine when the background of a shot is the primary aspect of the image. In this case, the people or other objects in the foreground may be of secondary importance for lighting, focus, or any other parameter. In some cases, the background module 818 may make this determination on its own. For example, when the initial image shows the relative scale of the person to the entire picture is much smaller than the size of the background, the primary subject of the initial image may be the background and the person may be of secondary importance. Further, when a person or object in the foreground is not centered within the image, the background module 818 may determine the background is the primary concern of the photographer (e.g., user).

The director mode 132 may also combine images of the same scene that have different exposure values. The user device 102 may be set to take multiple images of the same scene. The images may be bracketed around a certain exposure value or any other camera or image condition. The different values are able to capture different aspects of a scene under different camera conditions that improve the color, focus, brightness, and contrast of an image. The director mode 132 may be able to stick the images together into a single image that captures the ideal image conditions for portions of the scene. Therefore, objects in the image that would be competing with each other for tone or brightness adjustments can be accommodated by taking multiple images that are tailored their individual characteristics. The director mode 132 may combine or integrate the images together so that the image reflects the ideal conditions for disparate image objects.

A user preference module 820 may store user selected preferences or generate preferences based on the image history of the user. Accordingly, the user preference module 820 may prompt the user for camera device 102 settings or image parameter 116 preferences. Alternatively, the user preference module 820 may generate user preferences based, at least in part, on the images captured by the user and the location of the camera device 102 during image capture. The user preference criteria may include, but is not limited to, color enhancement, image resolution, still image versus video image, combining still image and video image sequences, image brightness, location based rules, exposure value, image stabilization, image compression, exterior preferences, interior preferences, and/or picture quality preferences.

Color enhancement may pertain to nationalistic color preferences or personal color preferences. A user may select to use nationalistic color preferences based, at least in part, on the location of the camera device 102 or the national origin of the subject 106 captured in an image 202. Also, the user may select to use a nationalistic color enhancement regardless of the camera device 102 location or the national origin of the subject 106. An example of a nationalistic preference may be based on users from different geographic regions or countries. For instance, an first group color enhancement may include a blue-green adjustment and a second group color enhancement may include an orange-red adjustment.

Image resolution user preferences may pertain to selecting between high resolution images or low resolution images based, at least in part, on the location of the camera device 102, lighting conditions, exposure settings, camera stabilization, subject movement, and/or image storage preferences. The user may select the preferences or the user preference module 820 may generate them based on how the user has used the camera device 102 in the past. For example, the user preference module 820 may determine that certain camera device 102 settings are used for exterior pictures on a frequent basis. Therefore, the user preference module 820 may set the camera device 102 to those settings when the camera device 102 is located outside. The camera settings may also be dependent on multiple image parameters 116, not just the exterior location. The generated preferences may also account for the time of day and the lighting conditions associated with the exterior location image history. For example, the generated preferences may be based on the how the user manually adjusts exposure settings based on certain types of lighting conditions. Additionally, the user preference module 820 may also determine that certain user preferences may be related to a specific location. Therefore, when exposure settings may be limited to a specific exterior location, the user preference module 820 may determine that the scenario may be an outlier may not be apply those settings to other exterior locations.

The user preference module 820 may also prompt the user for image brightness preferences. These may include minimum and maximum brightness thresholds. When the imaging server 114 determines the thresholds are exceeded or unmet, the user preference module 820 may warn the user of the condition. The brightness preferences may also include a location element that may adjust the thresholds based on the location (e.g., exterior, interior) of the camera device 102.

A camera device 102 user may also create location based preferences. These preferences may apply to any of the image parameters 116 or the camera device 102 settings. For example, the user may attend frequent sport or entertainment events at the same venue and may prefer certain camera device 102 settings that account for the ambient conditions at the venue or the type of activity (e.g., sports, concerts) occurring at the venue. For example, during sporting events, the camera device 102 settings may be set to account for moving subjects 502. The settings may also account for whether the games are played during the day or at night (e.g., brightness, lighting conditions). This may also account for concerts that may include low light conditions or that may alternate between lower light and higher light conditions. For instance, the user may want to toggle between these conditions several times during the concert. The location preferences may be set based on the type of location. For example, conditions may be applicable to a beach location, a mountain location, or any other geographic-based location. Therefore, whether the camera device 102 is located at a beach in the Caribbean or the Pacific, the beach based user preferences may be provided to the camera device 102.

The user preference module 820 may also store exposure settings or sequences. The exposure settings may be based, at least in part, on any of the image parameters 116, camera device 102 location, and/or combinations thereof. The exposure preferences may also include picture taking sequences that vary exposure settings. For example, the imaging server 114 may direct the camera device to capture three images for each picture that the user takes. The first picture may be at a first exposure setting, the second picture at a second exposure setting, and the third picture at a third exposure setting. In one embodiment, the first setting may have an exposure value of one, the second exposure setting may have an exposure value of zero, and the third exposure setting may have an exposure value of two. The user preference module 820 may also determine which exposure setting to use based, at least in part, on the history of exposure settings generated by the user of the camera device 102.

Image stabilization preferences may also be stored in the user preference module 820. The user may specify which type of stabilization procedures may be implemented based, at least in part, on the image parameters 116 and/or the location of the camera device 102. For example, the user preferences may direct the camera device 102 to use a certain stabilization procedures when the camera device zooms in one a subject. In another instance, the user preferences may use different stabilization procedures based, at least in part, on the level of zoom. The user preferences may also specify different stabilization procedures when taking still images or video images. The user preference module 820 may also recommend stabilization procedures based, at least in part, on how the camera device 102 user may have used the stabilization procedures in the past and under what conditions (e.g., image parameters, location).

A camera device 102 user may specify image compression preferences when storing images on the camera device 102. For example, the user may specify what level of compression may be used when the camera device 102 memory reaches a capacity threshold. In one instance, when the capacity threshold is less than 20%, the storage compression may be increased to enable more images to be stored on the camera device 102.

The user preference module 820 may also store picture quality preferences. The quality standards may apply to any of the image parameters 116 or combinations thereof. The user preferences may apply to one or more of the image parameters 116. Additionally, the user preferences for picture quality may include, but are not limited to, subjective concerns. For example, are the subjects smiling, looking at the camera, are the subjects obscured in any manner, and/or subject red eyes or blue eyes.

A location module 822 may determine the location of the camera device 102 using several techniques. In one embodiment, the camera device 102 may provide its location to the imaging server 114. The camera device 102 may have the capability to determine its location using a global positioning system or any other location determination technique. The location module 822 may determine the camera device 102 location based on the network connection. For example, the location module 822 may determine the location of the wireless network access points that the camera device 102 is using to send information over the network 112. The location module 822 may also receive location information from the cellular network that the camera device 102 may use to send information over the network 112. For example, the cellular network (not shown) may provide the location of the base station that is in communication with the camera device 102. Alternatively, the cellular network may also determine the location of the camera device based, at least in part, on triangulation using several base stations with the cellular network.

A flicker module 824 may determine any instability in the light sources near the camera device 102. In one embodiment, the light instability may be related to oscillating energy provided to a light source from an electricity delivery network. Lights may influenced by their power source with regards to intensity and stability. Electricity may be delivered in an alternating current at a certain frequency. The frequency may be constant but the amplitude will oscillate between peak-to-peak values. This oscillation may cause the light to switch on and off at a frequency that may not noticed by the human eye. However, the camera device 102 may capture images at speeds that will be able to detect the oscillations. The flicker module 824 may identify the oscillations and may direct the camera device 102 to take pictures in a way that minimizes or eliminates the impact of those oscillations.

The flicker module 824 may identify the oscillations based on analyzing the initial image and may use the location information to determine the frequency of those oscillations. Most electrical delivery systems are operating at 50 Hz or 60 Hz. The location of the 50 Hz and 60 Hz may be determined by the imaging server 114. The flicker module 824 may use that information to provide instructions to the camera device 102 on how to avoid taking pictures when the light source cycles on or through the off state. Lighting systems may also use 200 Hz light emitting diodes. The flicker module 824 may also determine when lighting is provided from two more light sources with different frequencies. For instance, the flicker module 824 may identify the light frequency oscillations from a 50 Hz or 60 Hz light source and a 200 Hz light source. The flicker module 824 may adjust the exposure time or shutter speed to account for the disparate light frequency oscillations.

A director module 826 may provide instructions to camera device 102 related to the positioning of the camera device 102 or the subject 106. In some instances, the positioning may be based on one or more image parameters 116 or any other criteria that may improve the perceived quality of the images. For example, the director module 826 may determine that natural lighting 108 and the positioning of the camera device 102 and the subject (e.g., shadow subject 602) doesn't allow enough light to reflect off the face of the subject. Accordingly, the subject 602 may be obscured or a lack enough detail to be of sufficient quality. The director module 826 may recommend adding an additional light source that places more light on the face of the subject 602. The director module 826 may also recommend moving the subject 602 to a new position that enables the existing light source 108 to place more light on the face of the subject (e.g., shadow-free subject 608). The director module 826 may also recommend waiting to take the picture at a certain time of day based known natural light source 108 movement. Once in position, the natural light source 108 may place more light on the face of the subject 608.

The director module 826 may also recommend reconfiguring the camera device 102 to take certain pictures. The camera device 102 may be able to use a different lens or filters to take certain types of pictures (e.g., long range, close up). The filters may include, but are not limited to, ultraviolet filters, skylight filters, polarizers, or color filters. The lenses may include, but are not limited to, telephoto, wide angle, or fish eye.

The camera device 102 may be any type of device that may be equipped to take still or video images. The camera device 102 may include, but is not limited to, cameras, smartphones, laptops, desktops, tablet computers, televisions, glasses, set-top boxes, game consoles, in-vehicle computer systems, and so forth. In one embodiment, the camera device comprises a tablet computer that includes a processors 828, memory 830, interfaces 832 and a power source 834.

The one or more processors 828 may individually comprise one or more cores as described above and are configured to access and execute (at least in part) instructions stored in the one or more memories 830. The one or more memories 830 may comprise one or more CRSMs as described above.

The one or more memories 830 may store instructions for execution by the one or more processors 828 which perform certain actions or functions. These instructions may include an operating system 836 configured to manage hardware resources, such as the interfaces 832, and provide various services to applications executing on the one or more processors 828.

The one or more memories 830 may also store lists, arrays, databases, flat files, and so forth. In some implementations, the memories 830 may be stored in memory external to the camera device 102, such as with a cloud storage service.

The one or more memories 830 may also store a variety of information, applications, and/or modules related to the display of native application content or non-native application content (e.g., internet browser application content). The applications and modules may include, but are not limited to, a camera module 838, a location module 840, and a resource module 842.

The camera module 838 may include any type of optical lens arrangement that may be used to capture still images and/or video images. The camera module 838 may also include a flash component that may provide artificial light to increase the amount of lighting available to capture an image. In some embodiments, the camera module 838 may be configurable to use different types of lenses, filters, or flash components.

The location module 840 may determine the location of the camera device 102. The location module 840 may comprise a global positioning system or any other positioning device that may use any technique to determine location. The location information may be provided to the imaging server 114 over the network 112. In certain instances, the location module 840 may receive location information from the image server 114.

The resource module 842 may monitor the power and memory levels associated with the camera device 102. The monitoring may be continuous, periodic, or based on user interactions with the camera device 102. The resource module 842 may monitor the amount of remaining memory 830 that may be used to store images and the amount of remaining power that may be consumed by the camera device 102. The remaining memory and power levels may be provided to the camera device 102.

The interfaces 832 allow for devices, such as keyboards, joysticks, touch sensors, cameras, microphones, speakers, haptic output devices, memories, and so forth, to be coupled to the camera device 102. The haptic output device may comprise one or more actuators, signal generators, and so forth. For example, the haptic output device may generate direct electrical stimulation of nerves of the user, actuate a piezoelectric element, actuate a motor, and so forth. The interfaces 832 may also include a wireless or wired communications interface or a network interface device that enables the camera device 102 to send and receive communications over the network 112. The wireless communication systems (not shown) may be similar to the wireless system described above.

The camera device 102 may also include a power source 834 that provides power to operate the processors 828, memory 830, and the interfaces 832. The power source may comprise a battery that may be replaced or recharged to provide continuous power to the components of the camera device 102.

Figure 9:
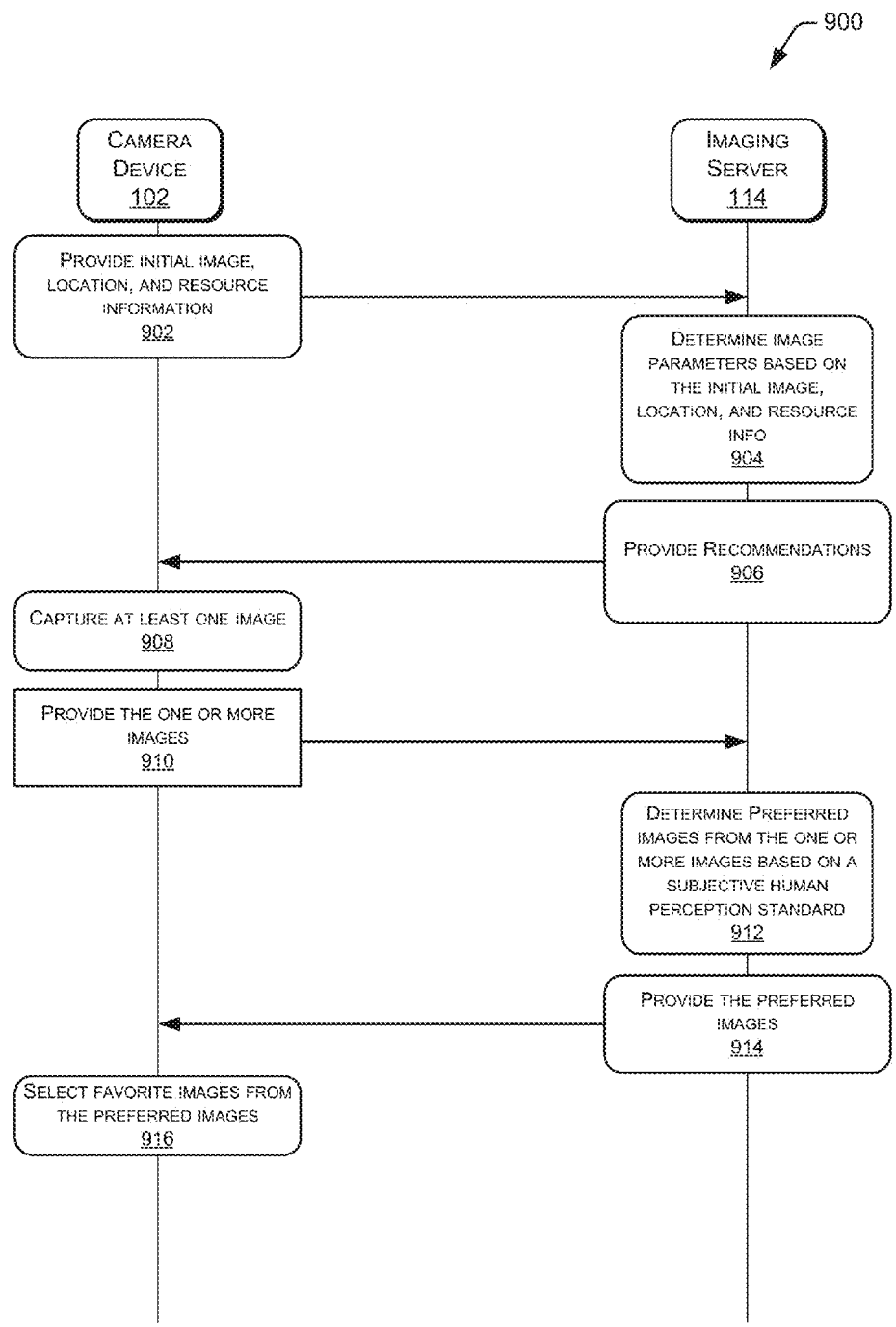
FIG. 9 illustrates a flow diagram for a method . . . in accordance with one or more embodiments of the disclosure.

FIG. 9 illustrates a flow diagram for a method 900 that illustrates one embodiment of the camera device 102 and the imaging server 114 interacting with each other to capture one or more images. The method 900 may begin near the top of the flow diagram and may proceed laterally or downward towards the bottom of the flow diagram. The relative position of the flow diagram blocks may indicate the sequence of the method 900. The blocks closer to the top of the flow diagram may indicate that they are performed or executed before the blocks below them. It should be noted that in other embodiments the sequencing of the flow diagram 900 may be altered and some operations may be omitted.

At block 902, the camera device 102 may be stabilized to capture an image 104. The camera device 102 will capture an initial image to send to the image server 114. In one embodiment, the initial image may be taken prior to the camera device 102 user initiating an image capture. The initial image may comprise a low resolution image that may be quickly communicated to the image server 114. The initial image may include information associated with the image parameters 116. In another embodiment, the initial image may be initiated by the camera device 102 user. In addition to the initial image, the camera device 102 may also provide the location of the camera device 102 when it took the initial image and the camera device's 102 resource information. The resource information may include an indication of memory availability and/or power availability of the camera device 102.

At block 904, the imaging server 114 may analyze the initial image to determine the image parameters 116 discussed above in the descriptions of FIGS. 1-8. The imaging server 114 may compare the image parameters 116 against any user preferences. In one instance, the user preferences were submitted by the user. In another instance, the user preferences were generated by the imaging server 114 based, at least in part, on historical user data for the camera device 102. The imaging server 114 may also incorporate the camera device location and/or the resource information in view of the user preferences. The imaging server 114 may prepare recommendation instructions that may be implemented by the camera device 102.

At block 906, the imaging server 114 may provide the recommendation instructions to the camera device 102. In one embodiment, the recommendation instructions may be after they have all been generated. In another embodiment, the recommendation instructions may be provided to the camera device as they are generated.

At block 908, the camera device 102 may implement the recommendation instructions and capture the image 104. In another embodiment, the camera device 102 user may be prompted to approve one or more of the recommendation instructions.

At block 910, the camera device 102 may provide the one or more images to the imaging server 114 for storage, optimization, and/or additional analysis.

At block 912, the imaging server 114 may determine which images are preferred based, at least in part, on a subjective human perception standard. The standard may determine whether image objects are visible or show enough detail to be easily viewed by the human eye. For example, the image may lack enough brightness to see facial features or other objects in an image. The standard may also include determining if subjects are looking at the camera and/or smiling when the image was captured. In another instance, the imaging server 114 may determine whether an intended subject was obscured by another person or object or that the subject moved. The imaging server 114 will select preferred images that would most likely be deemed higher quality than other images that may include a defect or undesirable feature.

At block 914, the imaging server 114 may provide the preferred images for review the camera device 102 user. In another embodiment, the imaging server 114 may provide all the images for review and may indicate which images were determined to be preferred.

At block 916, the camera device 102 user may select the images to save from the group of provided images. The images may be saved on the camera device 102 or on the imaging server 114.

Figure 10:
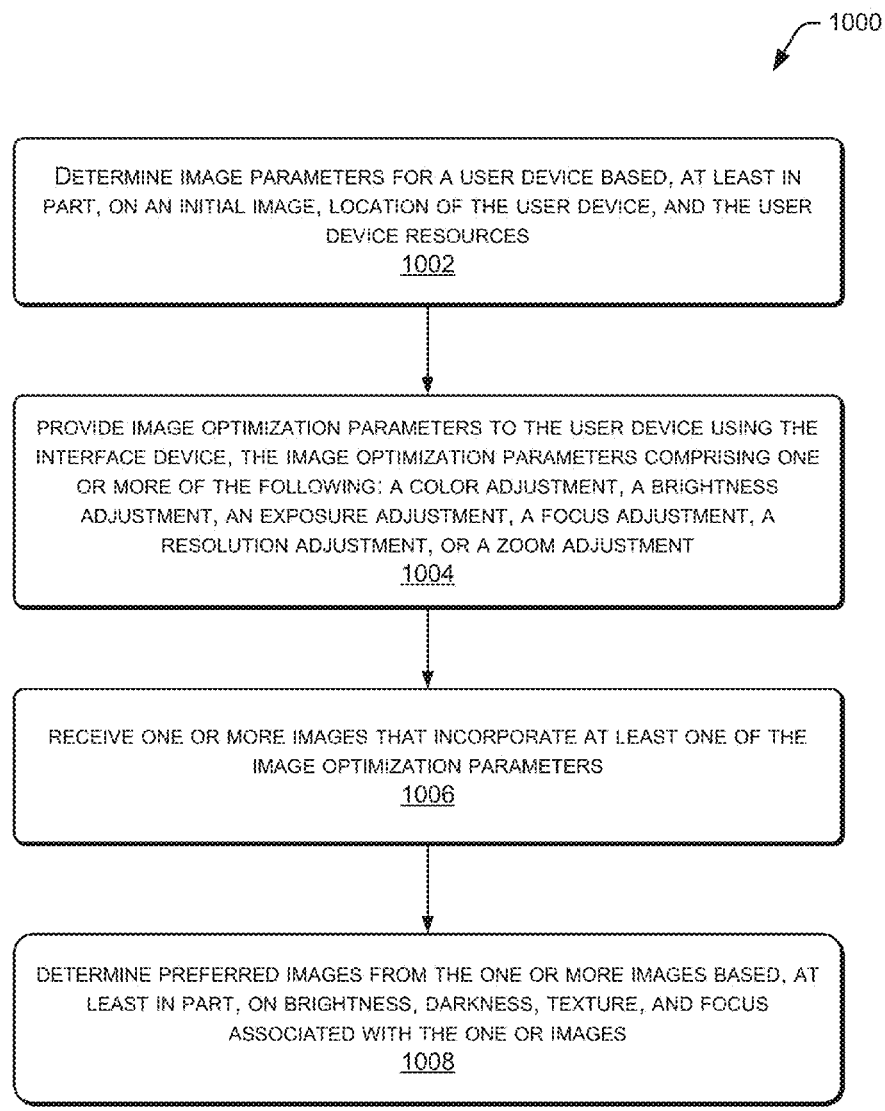
FIG. 10 illustrates a flow diagram for a method analyzing images from camera device on an imaging server in accordance with one or more embodiments of the disclosure.

FIG. 10 illustrates a flow diagram of a method for analyzing images from a camera device on an image server 114. An image may be analyzed in view of the image parameters 116, the location of the camera device 102, and the resources to determine how the camera device 102 characteristics or capabilities may be altered to capture a better picture.

At block 1002, the image server 114 may receive an image, the camera device location, and resource information associated with the camera device 102. The image server 114 may determine image parameters based, at least in part, on the received information. The image parameters may include, but are not limited to, brightness 118, light source 120, background 122, user vibration 124, skin tone 126, subject motion 128, user preference 130, and/or director mode 132. The image parameters 116 are discussed above, in greater detail, in the description of FIGS. 1-7.

At block 1004, the image server 114 may generate image optimization parameters comprising one or more of the following: a color adjustment, a brightness adjustment, an exposure adjustment, a focus adjustment, a resolution adjustment, or a zoom adjustment.

The color adjustment may be based on determining the national origin of subjects (e.g., subject 106, subject 208) in the image 204. The national origin color adjustment may also be based, at least in part, on the location of the camera device 102. In one specific embodiment, when the location is in a certain geographic area, a color adjustment associated with that geographic area may be used. Color adjustments may also be used based on user preferences or user history.

The exposure adjustment may be based on a low light conditions or moving subject 502 in the image 504. The camera device's exposure value may be adjusted up to account for the moving subject 502 or adjusted down to capture more light when the camera device 102 is in low light conditions.

The focus adjustment may be based on unclear or blurry images that are not associated with a moving subject 502 or a moving camera device 102. The focus adjustment may be used to improve image clarity or detail.

The resolution adjustment may be based on the camera device 102 resource information. The resource information may include the remaining memory availability. For example, when the amount of remaining memory reaches or exceeds a threshold amount, the camera device 102 may capture lower resolution images. The lower resolution images consume a smaller amount of memory than higher resolution images. Accordingly, the camera device 102 may be able to store more of the lower resolution images than higher resolution images.

The zoom adjustment may be based on the image including a blurry or unclear moving subject 502. The camera device 102 may account for the movement by zooming out to capture the moving subject 502 in a wider view. The zoom adjustment may minimize the blurry features in the image.

At block 1006, the imaging server 114 may provide the image optimization parameters to the camera device and may receive back one or more images that incorporate at least one of the image optimization parameters.

At block 1008, the imaging server may then determine preferred images from the one or more images based, at least in part, on brightness, darkness, texture, and focus associated with the one or images. The imaging server may rank the images based on how a person may perceive the quality of the images. This may include one or more of the following conditions: image clarity, highlights, mapping, shadows, smiling subjects, subjects looking at the camera, and/or obscured image objects. In one embodiment, the preferred images may be provided to the camera device 102 user to select which images should be kept or discarded.

Figure 11:
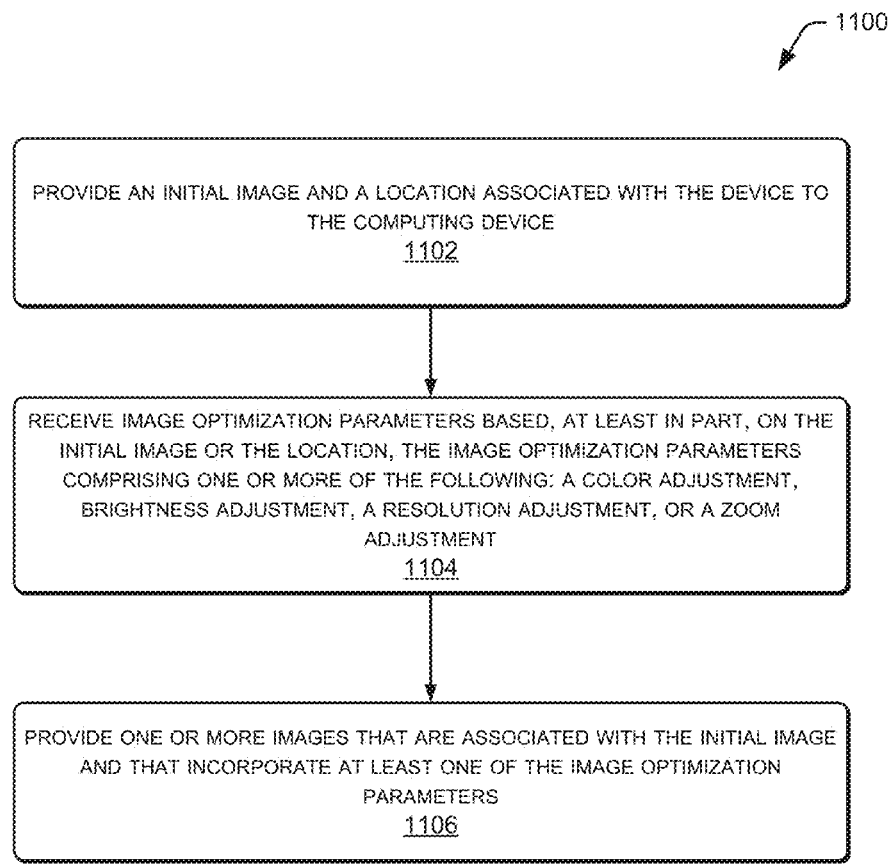
FIG. 11 illustrates a flow diagram for a method implementing imaging instructions on a camera device in accordance with one or more embodiments of the disclosure.

FIG. 11 illustrates a flow diagram for a method 1100 for implementing imaging instructions on a camera device 102. The camera device 102 may receive instructions that may alter its image capturing capability to adjust for anomalous conditions or image defects. The anomalous conditions may pertain to lighting conditions that induce too much or too little brightness. The image defects may pertain to blurry images related to a moving subject 502.

At block 1102, the camera device 102 may provide an initial image and a location associated with the device to the imaging server 114. The initial image may be an image that is captured prior to the camera device 102 user initiating the capture of an image. The initial image may be provided to the imaging server to determine whether any of the camera device 102 settings or parameters may be adjusted to improve image quality. The initial image may provide information that may be used to generate image optimization parameters that may be used to adjust the camera device 102 settings or parameters. In one embodiment, the initial image may be a lower resolution image than what the user may prefer. The lower resolution image enables quicker delivery over the network 112 to the imaging server 114.

At block 1104, the camera device 102 may receive image optimization parameters based, at least in part, on the initial image or the location of the camera device 102. The image optimization parameters may include one or more of the following: a color adjustment, exposure adjustment, a resolution adjustment, or a zoom adjustment. The optimization parameters are similar to the optimization parameters described above in the description of FIG. 10.

At block 1106, the camera device 102 may provide one or more images that are associated with the initial image and that incorporate at least one of the image optimization parameters. The optimization parameters may further include, but are not limited to, brightness, light source frequency, light source type, subject speed or motion, subject reflectivity, and/or background reflectivity.

In another embodiment, the method 1100 may further comprise the camera device 102 provides power and memory availability associated with the camera device 102. The camera device 102 may receive instructions to adjust to a lower image resolution when the memory availability is low or below a threshold limit. When the power level is low or below a threshold limit, the camera device 102 may receive instructions to take still images instead of video images to conserve power.

In another embodiment, the method 1100 may further comprise receiving instructions to take multiple images of the same subject at different exposure levels. In one specific embodiment, the camera device 102 may be instructed to capture an image with at least three different exposure values.

Figure 12:
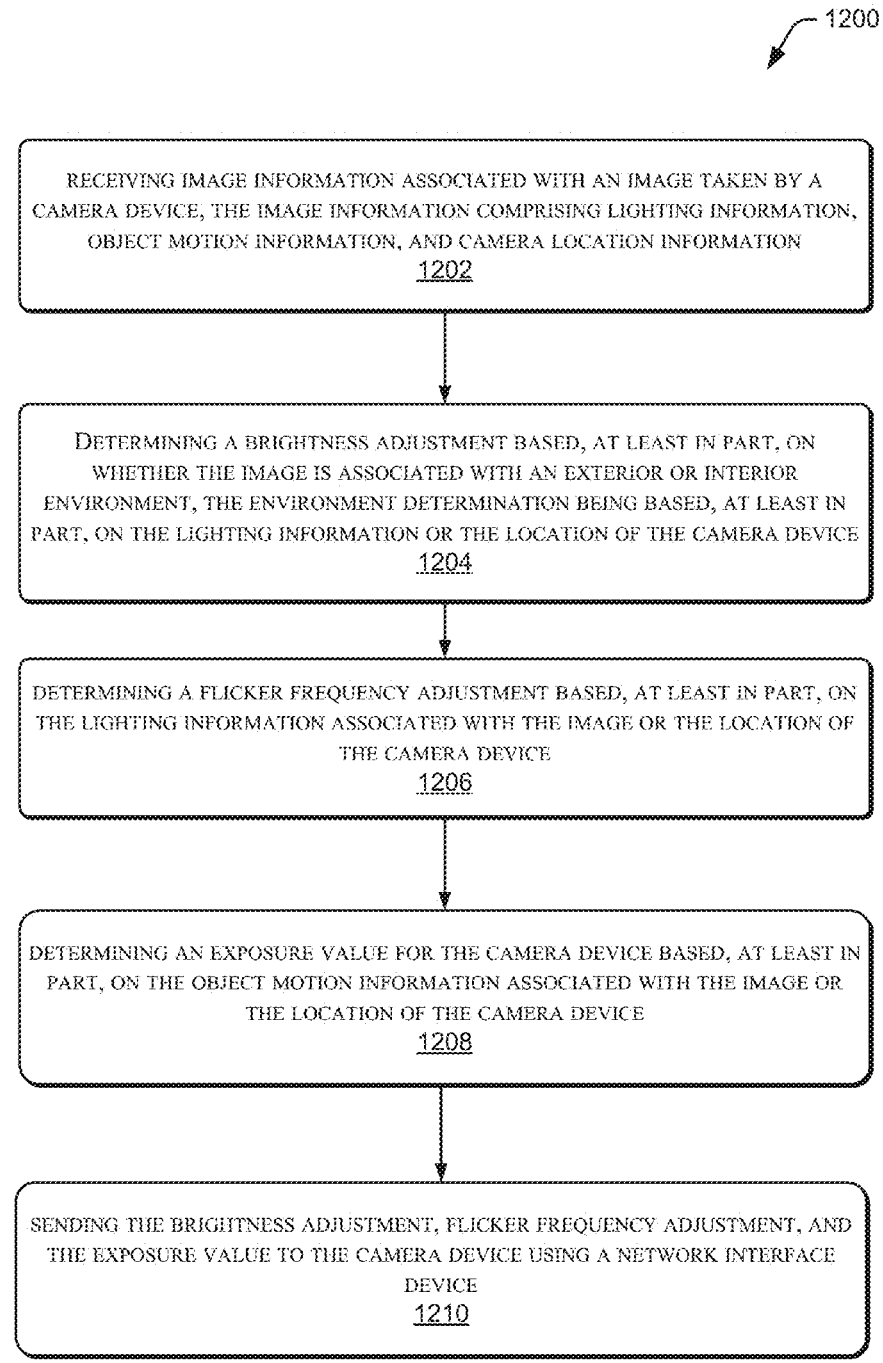
FIG. 12 illustrates a flow diagram for another method for analyzing images from a camera device in accordance with one or more embodiments of the disclosure.

FIG. 12 illustrates a flow diagram for a method 1200 for analyzing images from a camera device 102 on an imaging server 114. In some embodiments, the imaging server 114 may select one or more image parameters to analyze based on the image received from the camera device or user preferences. The user preferences may be provided by the user or generated by the imaging server 114 based, at least in part, on the user's image history.

At block 1202, the imaging server 114 may receive image information associated with an image taken by a camera device 102. The image information may include lighting information, object motion information, and camera location information. The lighting information may indicate the location and/or the type of light sources in the image. The object motion information may be related to a moving subject 502 or object in the image. The location information may indicate the country information which may be used to determine the type of light source or the type of electrical system that powers the light source.

At block 1204, the imaging server 114 may determine a brightness adjustment based, at least in part, on whether the image is associated with an exterior or interior environment. The environment determination may be based, at least in part, on the lighting information or the location of the camera device 102. The lighting information may indicate whether a natural light source or an artificial light source is associated with the image. The type of light may be determined on the location or the flicker frequency. Artificial lights may have a flicker frequency due to their power source operating on alternating current. Natural lighting may not have this flicker frequency signature. The presence of artificial light and the absence of natural light may be an indicator that the camera device 102 is located inside a structure. In another instance, the camera device 102 location information may also indicate whether the image was captured outside or inside an enclosed structure.

At block 1206, the imaging server 114 may determine a flicker frequency adjustment based, at least in part, on the lighting information associated with the image or the location of the camera device 102. Artificial light sources that use electricity may cycle on and off based on the electricity's line frequency. The line frequency may be location dependent and may be 50 Hz or 60 Hz depending on the location. The flicker frequency may cause dark bands across the image due to the light source oscillations. The flicker frequency adjustment may account for the light source oscillations and enable the camera device 102 to capture images without the dark bands.

At block 1208, the imaging server 115 may also determine an exposure value for the camera device 102 based, at least in part, on the object motion information associated with the image or the location of the camera device 102. The object motion information may include a subject or object in the image that is moving when the image is captured. The movement may cause the subject or object to appear blurry or distorted in the image. The imaging server 114 may adjust the exposure value (e.g., increase the shutter speed) so the moving subject or object may not appear blurry or distorted. The imaging server 114 may also adjust the exposure value based on the camera device 102 location or user preferences. For example, if the location is a sports venue, the imaging server 114 may predict that the captured images may include moving subjects. Increasing the exposure value may minimize the impact of the movement on the captured images. In another embodiment, the user preferences may indicate that prior captured images at the location included subject movement. Accordingly, the imaging server 114 may increase the exposure value based, at least in part, on the prior image history.

At block 1210, the imaging server 114 may send the brightness adjustment, flicker frequency adjustment, and the exposure value to the camera device 102 over a network 112.

In another embodiment, the method 1200 may further comprise determining one or more of the following: a color adjustment, a user vibration adjustment, a background adjustment, and/or a shadowing adjustment. For example, the camera device 102 may also determine a color adjustment for the camera device based, at least in part, on the camera device location. For example, this may include a color adjustment based on publicly available information about the background in the image. In another embodiment, the color enhancement may be related to a national origin preference associated with the location. The user vibration adjustment may be related to the amount of vibration from the camera device 102 user. The user vibration adjustment may be based on vibration detected by the camera device 102 or estimated based on the image. Historical user vibration data may also be incorporated in determining the user vibration adjustment. The background adjustment may adjust exposure values based on the reflectivity from the background 606 in the background image 604. The shadow adjustment may be based on the director mode analysis as described in the description of FIG. 6.

Figure 13:
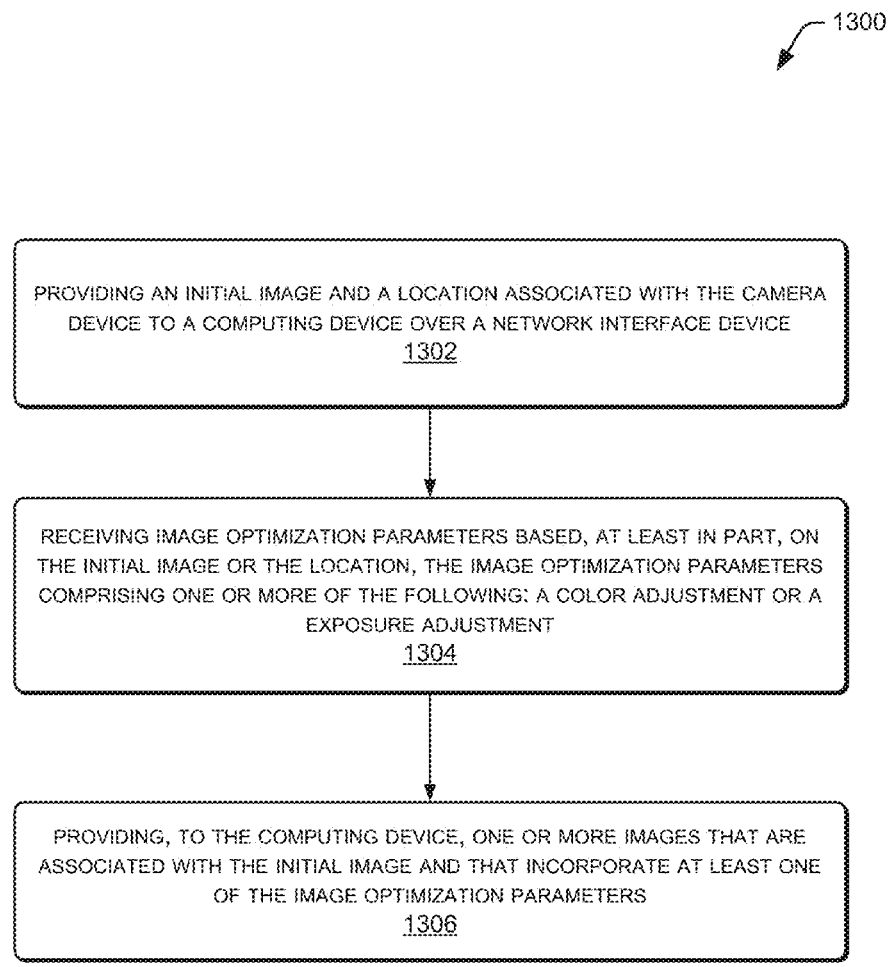
FIG. 13 illustrates a flow diagram for another method for implementing imaging instructions on a camera device in accordance with one or more embodiments of the disclosure.

FIG. 13 illustrates a flow diagram of a method 1300 for implementing imaging adjustments on a camera device 102. The image server 114 may generate image adjustments based on the location of the camera device 102. As noted above, the image adjustments may include, but are not limited to, color adjustments and exposure adjustments. As discussed above in the description of FIG. 2, color adjustments based on national origin may be made based on the location of the camera device 102. Exposure adjustments may be made based on whether the camera device 102 is outside or inside a structure. The time of day for outside images may also impact exposure adjustments as discussed above in the description of FIGS. 3 and 6.

At block 1302, the camera device 102 may provide an initial image and a location associated with the camera device 102 to an image server 114 over a network 112. The location may be determined by the camera device 102. In another embodiment, the location may be determined by the image server 114 based, at least in part, on network 112 component locations. For example, this may include known locations of network access points where the camera device 102 communicates with the image server 114.

At block 1304, the camera device may receive the image optimization parameters based, at least in part, on the location of the camera device 102. The image optimization parameters may comprise one or more of the following: a color adjustment or an exposure adjustment. The color adjustment may be based, at least in part, on national origin based color preferences. The exposure adjustment may be based, at least in part, on the camera device being outside on a cloudy day and/or on the time of day (e.g., location of the sun).

At block 1306, the camera device 102 may provide one or more images to the imaging server 114. The one or more images may be associated with the initial image and they incorporate at least one of the image optimization parameters.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one network interface device to communicate with a user device comprising a camera;
    at least one memory for storing computer-executable instructions; and
    at least one processor configured to access the at least one interface device and the at least one memory and execute the computer-executable instructions to:
        determine image parameters for the user device based, at least in part, on one or more of an initial image from the user device or resource information associated with the user device;
        determine a geographic location of the user device based at least in part on the initial image;
        determine image optimization parameters based, at least in part, on region preferences for the geographic location and on stored user preferences, the user preferences comprising one or more of image coloring, image brightness, image exposure value, or a number images to capture with different exposure values;
        send image optimization parameters to the user device using the interface device, the image optimization parameters comprising one or more of the following: a color adjustment, an exposure adjustment, a focus adjustment, a resolution adjustment, or a zoom adjustment;
        receive one or more images that that were captured using at least one of the image optimization parameters; and
        determine one or more higher quality images from the one or more images based, at least in part, on one or more of brightness, darkness, texture, or focus associated with the one or more images.

2. The system of claim 1, wherein the at least one processor is further configured to execute the computer-executable instructions to:
    determine the initial image comprises an indication of a natural light source, the initial image comprising a scene;
    determine a time of day to capture an additional image of the scene, the determination of the time of day being based, at least in part, on the natural light source or the location of the user device; and
    provide the time of day to capture the additional image of the scene to the user device.

3. The system of claim 1, wherein the at least one processor is further configured to execute the computer-executable instructions to determine a hand vibration compensation factor to account for hand vibrations of the user of the camera when the one or more initial images are captured, the hand vibrations being based, at least in part, on a time of day, an age of the user of the camera, or a hand vibration history associated with the user.

4. The system of claim 3, wherein the hand vibration compensation factor comprises increased shutter speed for the camera.

5. The system of claim 1, wherein the initial image comprises visual information comprising one or more of the following:
    brightness of the one or more images;
    light source type used to capture the one or more images;
    speed of a subject in the one or more image;
    light reflectivity from the subject; or
    light reflectivity from a background in the image.

6. The system of claim 5, wherein the subject light reflectivity from the subject is based, at least in part, on light reflected from the skin of the subject.

7. The system of claim 1, wherein the at least one processor is further configured to execute the computer-executable instructions to determine the color adjustment based, at least in part, on the location of the user device.

8. The system of claim 1, wherein the user device resource information comprises one or more of remaining user device power or remaining memory to store images on the user device.

9. The system of claim 8, wherein the resolution adjustment is based, at least in part, on the remaining memory on the user device.

10. The system of claim 8, wherein the at least one processor is further configured to execute the computer-executable instructions to send a user recommendation based, at least in part, on the remaining power, the user recommendation comprising an indication to capture still images instead of video images when the remaining power is below a threshold value.

11. The system of claim 1, wherein the at least one processor is further configured to execute the computer-executable instructions to provide a warning when the brightness associated with the initial image is below a threshold amount.

12. A device, comprising:
  at least one network communication device to communicate with a computing device;
  at least one display screen to display content provided by the computing device;
  at least one memory that stores computer-executable instructions; and
  at least one processor configured to access the at least one interface device and the at least one memory and execute the computer-executable instructions to:
    provide an initial image and a geographic location of the device to the computing device;
    identify image optimization parameters based, at least in part, on the initial image, region preferences for the geographic location of the device and user preferences stored on the computing device, the user preferences comprising one or more of image coloring, image brightness, image exposure value, or a number images to capture with different exposure values; and
    generate one or more images that use at least one of the image optimization parameters, the one or more images comprising at least a portion of a scene captured in the initial image.

13. The device of claim 12, wherein the at least one processor is further configured to execute the computer-executable instructions to send a power level and a memory availability of the device.

14. The device of claim 13, wherein the at least one processor is further configured to execute the computer-executable instructions to receive an instruction from the computing device to adjust image resolution based, at least in part, on the memory availability.

15. The device of claim 13, wherein the at least one processor is further configured to execute the computer-executable instructions to receive a recommendation from the computing device to take still images based, at least in part, on the power level of the device.

16. The device of claim 13, wherein the image optimization parameters are determined based, at least in part, on:
  a color adjustment of the one or more images;
  an exposure adjustment of the one or more images,
  a resolution adjustment of the one or more images, or
  or a zoom adjustment of the one or more images.

17. The device of claim 12, wherein the at least one processor is further configured to execute the computer-executable instructions to receive instructions from the computing device to capture the one or more images with at least three different exposure values based, at least in part, on the user preferences.

18. The device of claim 12, wherein the at least one processor is further configured to execute the computer-executable instructions to receive instructions from the computing device to change an orientation of the device to reduce shadowing effects on a subject in the one or more images.

19. Non-transitory computer-readable media storing computer-executable instructions that, when executed by at least one processor, configure the at least one processor to perform operations comprising:
  sending an image captured by a camera and a geographic location of the camera device to a computing device using a network communication device, the image comprising a scene;
  identifying image optimization parameters based, at least in part, on the image and region preferences at the geographic location and user preferences stored on the computing device, the user preferences comprising one or more of image coloring, image brightness, image exposure value, or a number images to capture with different exposure values
  capturing one or more additional images of the scene using the image optimization parameters; and
  sending the one or more additional images to the computing device.

* * * * *